United States Patent
Höglund et al.

(10) Patent No.: US 11,924,763 B2
(45) Date of Patent: Mar. 5, 2024

(54) WAKE-UP SIGNALLING IN A WIRELESS COMMUNICATION SYSTEM

(71) Applicant: Telefonaktiebolaget LM Ericsson (publ), Stockholm (SE)

(72) Inventors: Andreas Höglund, Solna (SE); Håkan Palm, Växjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 17/290,597

(22) PCT Filed: Oct. 31, 2019

(86) PCT No.: PCT/EP2019/079902
§ 371 (c)(1),
(2) Date: Apr. 30, 2021

(87) PCT Pub. No.: WO2020/089427
PCT Pub. Date: May 7, 2020

(65) Prior Publication Data
US 2022/0007291 A1    Jan. 6, 2022

Related U.S. Application Data

(60) Provisional application No. 62/754,114, filed on Nov. 1, 2018.

(51) Int. Cl.
*H04W 52/02* (2009.01)
*H04W 68/02* (2009.01)

(52) U.S. Cl.
CPC ....... *H04W 52/0235* (2013.01); *H04W 68/02* (2013.01)

(58) Field of Classification Search
CPC ....... H04W 4/22; H04W 4/02; H04W 76/023; H04W 4/90; H04W 76/14; H04W 56/002;
(Continued)

(56) References Cited

U.S. PATENT DOCUMENTS 10,849,068 B2 *  11/2020  Liu .................. H04L 5/0053
10,880,834 B2 *  12/2020  Liu .................. H04W 72/0446
(Continued)

FOREIGN PATENT DOCUMENTS

CN    102892082 A    1/2013
EP     3682679 B1 *  8/2021   ......... H04L 27/2613
(Continued)

OTHER PUBLICATIONS

3GPP, "3GPP TS 36.211 V15.3.0", 3rd Generation Partnership Project; Technical Specification Group Radio Access Network; Evolved Universal Terrestrial Radio Access (E-UTRA); Physical channels and modulation (Release 15), Sep. 2018, 1-237.
(Continued)

*Primary Examiner* — Nathan S Taylor
(74) *Attorney, Agent, or Firm* — Murphy, Bilak & Homiller, PLLC

(57) ABSTRACT

A wireless device (14) is configured for use in a wireless communication system (10). The wireless device (14) is configured to determine a wake-up signal, WUS, group (11-1) to which the wireless device (14) belongs, based on a third function (f3) of a device identifier (14A) for the wireless device (14). The third function (f3) is different than a first function (f1) of the device identifier (14A) based on which a paging frame (3) of the wireless device (14) is determined and/or is different than a second function (f2) of the device identifier (14A) based on which a paging narrowband or carrier (9) of the wireless device (14) is determined. The wireless device (14) is also configured to monitor for a WUS (18) that indicates wireless devices in the determined WUS group (11-1) to which the wireless device (14) belongs are to wake up.

19 Claims, 17 Drawing Sheets

(58) Field of Classification Search
CPC ......... H04W 56/0045; H04W 56/0065; H04W 56/00; H04W 28/18; H04W 24/04; H04W 52/0235; H04W 52/02; H04W 68/02; H04J 3/06; Y02D 30/70

See application file for complete search history.

(56) References Cited

U.S. PATENT DOCUMENTS

| | | | | |
|---|---|---|---|---|
| 2013/0136072 | A1* | 5/2013 | Bachmann | H04W 68/00 370/329 |
| 2017/0332327 | A1 | 11/2017 | Fang et al. | |
| 2019/0090191 | A1* | 3/2019 | Liu | H04L 5/0053 |
| 2019/0103950 | A1* | 4/2019 | Liu | H04W 56/001 |
| 2019/0124655 | A1* | 4/2019 | Liu | H04L 5/003 |
| 2019/0159128 | A1* | 5/2019 | Lin | H04W 68/00 |
| 2019/0239189 | A1* | 8/2019 | Hwang | H04W 52/0216 |
| 2019/0320412 | A1* | 10/2019 | Drevö | H04W 72/20 |
| 2019/0349856 | A1* | 11/2019 | Liu | H04W 72/0453 |
| 2020/0029302 | A1* | 1/2020 | Cox | H04W 68/02 |
| 2020/0053645 | A1* | 2/2020 | Charbit | H04W 76/28 |
| 2020/0053670 | A1* | 2/2020 | Jung | H04W 56/00 |
| 2020/0229095 | A1* | 7/2020 | Shrestha | H04W 52/0235 |
| 2020/0245317 | A1* | 7/2020 | Hwang | H04W 68/02 |
| 2021/0314869 | A1* | 10/2021 | Ye | H04J 13/00 |
| 2021/0337507 | A1* | 10/2021 | Selvaganapathy | H04W 72/51 |
| 2021/0377854 | A1* | 12/2021 | Hwang | H04W 52/0216 |
| 2022/0046540 | A1* | 2/2022 | Kwon | H04W 68/005 |

FOREIGN PATENT DOCUMENTS

| | | | | |
|---|---|---|---|---|
| WO | | 2018083605 | A1 | 5/2018 |
| WO | | 2019030143 | A1 | 2/2019 |
| WO | WO-2019063336 | A1 * | 4/2019 | ........ H04W 28/0268 |

OTHER PUBLICATIONS

3GPP, "3GPP TS 36.213 V15.2.0", 3rd Generation Partnership Project; Technical Specification Group Radio Access Network; Evolved Universal Terrestrial Radio Access (E-UTRA); Physical layer procedures (Release 15) The present, Jun. 2018, 1-541.

3GPP, "3GPP TS 36.213 V15.3.0", 3rd Generation Partnership Project; Technical Specification Group Radio Access Network; Evolved Universal Terrestrial Radio Access (E-UTRA); Physical layer procedures (Release 15), Sep. 2018, 1-546.

3GPP, "3GPP TS 36.304 V15.1.0", 3rd Generation Partnership Project; Technical Specification Group Radio Access Network; Evolved Universal Terrestrial Radio Access (E-UTRA); User Equipment (UE) procedures in idle mode (Release 15), Sep. 2018, 1-55.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, 1-770.

3GPP, "3rd Generation Partnership Project; Technical Specification Group Radio Access Network; Evolved Universal Terrestrial Radio Access (E-UTRA); User Equipment (UE) procedures in idle mode (Release 15) 3GPP TS 36.304 V15.0.0", 3GPP TS 36.304 V15.0.0, Jun. 2018, 1-52.

Ericsson, "UE_ID based WUS grouping", 3GPP, TSG-RAN WG2 #104, Tdoc R2-18xxxxx, Spokane, USA, Nov. 12-16, 2018, 1-5.

LG Electronics, "Discussion on UE-grouping wake up signal in NB-IoT", 3GPP TSG RAN WG1 Meeting #94, R1-1808474, Gothenburg, Sweden, Aug. 20-24, 2018, 1-4.

LG Electronics, "Discussion on UE-grouping wake up signal in NB-IoT", 3GPP TSG RAN WG1 Meeting #94bis, R1-1810240, Chengdu, China, Oct. 8-12, 2018, 1-6.

3GPP, "3GPP TS 36.304 V14.3.0", 3rd Generation Partnership Project; Technical Specification Group Radio Access Network; Evolved Universal Terrestrial Radio Access (E-UTRA); User Equipment (UE) procedures in idle mode (Release 14), Jun. 2017, 1-49.

Huawei, et al., "UE-Group based Wake-up signal", 3GPP TSG-RAN WG2 Meeting #103bis, R2-1813915, Chengdu, China, Oct. 8-12, 2018, 1-3.

Mediatek Inc., "UE Group Wake-up Signal for NB-IoT", 3GPP TSG-RAN WG2 Meeting #103bis, R2-1813719, Chengdu, China, Oct. 8-12, 2018, 1-4.

* cited by examiner

WAKE-UP SIGNALLING IN A WIRELESS COMMUNICATION SYSTEM

TECHNICAL FIELD

The present application relates generally to wake-up signaling in a wireless communication system, and more particularly to waking up different groups of wireless devices with wake-up signaling.

BACKGROUND

A wireless device in a wireless communication network is typically configured to operate in a discontinuous reception (DRX) mode after a period of inactivity. In DRX mode, the wireless device is configured to receive information from the network only discontinuously in time. This relieves the wireless device from having to continuously monitor a downlink control channel (e.g., a physical downlink control channel, PDCCH) for downlink control information, including for instance paging messages intended for the device. Relieved from such continuous monitoring, the wireless device may operate in a sleep state when no information from the network is expected, e.g., by turning off at least some user equipment hardware/circuitry such as one or more receivers. Operating in a sleep state conserves the device's power and thereby prolongs the device's battery life.

Monitoring the downlink control channel, e.g., for paging messages, nonetheless consumes non-trivial amounts of power even when only monitored discontinuously in time. Power conservation may be realized through the use of a so-called wake-up signal. A wake-up signal is a physical signal that indicates the wireless device needs to awaken from a sleep state (or stay awaken) in order to monitor the downlink control channel, e.g., for paging messages. The decoding time for the wake-up signal may be considerably shorter than the decoding time for the downlink control channel. Accordingly, the wireless device may consume less power monitoring for a wake-up signal (e.g., using a wake-up receiver that is designed and/or dedicated for receiving such a wake-up signal, as a complement to another receiver suitable for receiving the downlink control channel). No matter the type of receiver used for receiving the wake-up signal, use of the wake-up signal allows the wireless device to stay in the sleep state for longer.

In order to realize the full benefit of the wake-up signal, the wake-up signal ideally should wake up wireless devices with forthcoming transmissions on the downlink control channel, and should not wake up wireless devices with no such forthcoming transmissions. Grouping wireless devices for wake-up signaling in this way may prove particularly challenging, though, especially while respecting any existing grouping of devices for paging signaling.

SUMMARY

According to some embodiments herein, a wireless device belongs to a wake-up signal (WUS) group that is a function of a device identifier for the wireless device, e.g., an international mobile subscriber identifier (IMSI) uniquely identifying every wireless device of the wireless communication network, or an identifier based on the IMSI. The function may be different than a function according to which a paging frame of the wireless device is determined and/or different from a function according to which a paging narrowband or carrier of the wireless device is determined from that same device identifier. This may effectively mean that different (e.g., non-overlapping) portions of the device identifier dictate the device's WUS group, paging frame, and/or paging narrowband or carrier. Some embodiments may thereby ensure that wireless devices with the same paging frame and/or paging narrowband/carrier may nonetheless be distributed over different WUS groups. This may in turn reduce false paging probability, reduce wireless device power consumption, and reduce wireless device processing load and thereby provide benefits such as extended battery lifetime.

More particularly, embodiments herein include a method performed by a wireless device configured for use in a wireless communication system. The method comprises determining a WUS group to which the wireless device belongs, based on a third function of a device identifier for the wireless device. This third function is different than a first function (of the device identifier) based on which a paging frame of the wireless device is determined and/or is different than a second function (of the device identifier) based on which a paging narrowband or carrier of the wireless device is determined. The method then comprises monitoring for a WUS that indicates wireless devices in the determined WUS group to which the wireless device belongs are to wake up.

In some embodiments, according to the first function the paging frame of the wireless device depends on a first portion of bits of the device identifier and/or according to the second function the paging narrowband or carrier of the wireless device depends on a second portion of bits of the device identifier. And, according to the third function the WUS group of the wireless device depends on a third portion of bits of the device identifier that is different than the first portion and/or the second portion. In one embodiment, the third portion is independent, non-overlapping, and/or uncorrelated with the first portion and/or the second portion.

In some embodiments, the device identifier is an IMSI for the wireless device or is derived from the IMSI.

In some embodiments, the third function is a function of at least: the device identifier; and either a number of paging narrowbands or a total weight across paging carriers.

In some embodiments, the third function is a function (e.g. a portion/fraction, e.g. the bits of the third portion of bits as described below) of the device identifier, and at least the number of paging frames per paging cycle, and a number of paging occasions per paging frame.

In other embodiments, the third function is equal to floor(floor(UE_ID/(N*Ns))/Nn) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups.

In still other embodiments, the third function is equal to floor(UE_ID/(N*Ns*Nn)) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups.

In yet other embodiments, the third function is equal to floor(UE_ID/(N*Ns)) mod Nw, where UE_ID is a function of the device identifier, where N is a number of paging frames per paging cycle, where Ns is a number of paging occasions per paging frame, and where Nw is a number of WUS groups.

In further embodiments, the third function is equal to floor(UE_ID/Nn) mod Nw, where UE_ID is a function of the device identifier, where Nn is a number of paging narrowbands or carriers, and where Nw is a number of WUS groups.

In some embodiments, the method further comprises one or more of: determining the paging frame of the wireless device based on the first function of the device identifier; and determining the paging narrowband or carrier of the wireless device based on the second function of the device identifier.

In some embodiments, the method further comprises: receiving the WUS based on said monitoring; responsive to receiving the WUS, awakening the wireless device from a sleep state; and after awakening, monitoring for a paging message during the paging frame and/or on the paging narrowband or carrier.

In some embodiments, the first, second, and third functions are functions of UE_ID, wherein UE_ID is equal to the device identifier modulus an integer X.

Embodiments herein also include a method performed by a radio network node configured for use in a wireless communication system. The method comprises determining a WUS group to which a wireless device belongs, based on a third function of a device identifier for the wireless device. This third function is different than a first function (of the device identifier) based on which a paging frame of the wireless device is determined and/or is different than a second function (of the device identifier) based on which a paging narrowband or carrier of the wireless device is determined. The method then comprises transmitting a WUS that indicates wireless devices in the determined WUS group to which the wireless device belongs are to wake up.

In other words, a paging frame of the wireless device is (determined by) a first function of a device identifier for the wireless device and/or a paging narrowband or carrier of the wireless device is (determined by) a second function of the device identifier. The WUS group to which the wireless device belongs is (determined by) a third function of the device identifier that is different than the first function and/or the second function.

In some embodiments, determining the paging frame based on/according to the first function comprises determining the paging frame of the wireless device depending on a first portion of bits of the device identifier and/or determining the paging narrowband or carrier of the wireless device according to the second function comprises determining the paging narrowband or carrier depending on a second portion of bits of the device identifier. And, determining the WUS group of the wireless device according to the third function comprises determining the WUS group of the wireless device depending on a third portion of bits of the device identifier that is different than the first portion and/or the second portion. In one embodiment, the third portion is non-overlapping, independent, and/or uncorrelated with the first portion and/or with the second portion.

In some embodiments, the device identifier is an IMSI for the wireless device, or is based on/derived from the IMSI.

In some embodiments, the third function is a function of at least: the device identifier (the third portion of bits of the device identifier); and either a number of paging narrowbands or a total weight across paging carriers.

In some embodiments, the third function is a function of at least the device identifier, a number of paging frames per paging cycle, and a number of paging occasions per paging frame.

In other embodiments, the third function is equal to floor(floor(UE_ID/(N*Ns))/Nn) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups.

In still other embodiments, the third function is equal to floor(UE_ID/(N*Ns*Nn)) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups.

In yet other embodiments, the third function is equal to floor(UE_ID/(N*Ns)) mod Nw, where UE_ID is a function of the device identifier, where N is a number of paging frames per paging cycle, where Ns is a number of paging occasions per paging frame, and where Nw is a number of WUS groups.

In further embodiments, the third function is equal to floor(UE_ID/Nn) mod Nw, where UE_ID is a function of the device identifier, where Nn is a number of paging narrowbands or carriers, and where Nw is a number of WUS groups.

In some embodiments, the method further comprises one or more of: determining the paging frame of the wireless device based on the first function of the device identifier; and determining the paging narrowband or carrier of the wireless device based on the second function of the device identifier.

In some embodiments, the method further comprises, after transmitting the WUS, transmitting a paging message to the wireless device during the paging frame and/or on the paging narrowband or carrier.

In some embodiments, the first, second, and third functions are functions of UE_ID, wherein UE_ID is equal to the device identifier modulus an integer X.

Embodiments herein also include corresponding apparatus, computer programs, and non-transitory computer readable mediums. For example, embodiments include a wireless device configured for use in a wireless communication system. The wireless device is configured to determine a WUS group to which the wireless device belongs, based on a third function of a device identifier for the wireless device. This third function is different than a first function (of the device identifier) based on which a paging frame of the wireless device is determined and/or is different than a second function (of the device identifier) based on which a paging narrowband or carrier of the wireless device is determined. The wireless device is also configured to monitor for a WUS that indicates wireless devices in the determined WUS group to which the wireless device belongs are to wake up.

Embodiments also include a radio network node configured for use in a wireless communication system. The radio network node is configured to determine a WUS group to which a wireless device belongs, based on a third function of a device identifier for the wireless device. This third function is different than a first function (of the device identifier) based on which a paging frame of the wireless device is determined and/or is different than a second function (of the device identifier) based on which a paging narrowband or carrier of the wireless device is determined. The radio network node is also configured to transmit a WUS that indicates wireless devices in the determined WUS group to which the wireless device belongs are to wake up.

DETAILED DESCRIPTION

Figure 1:
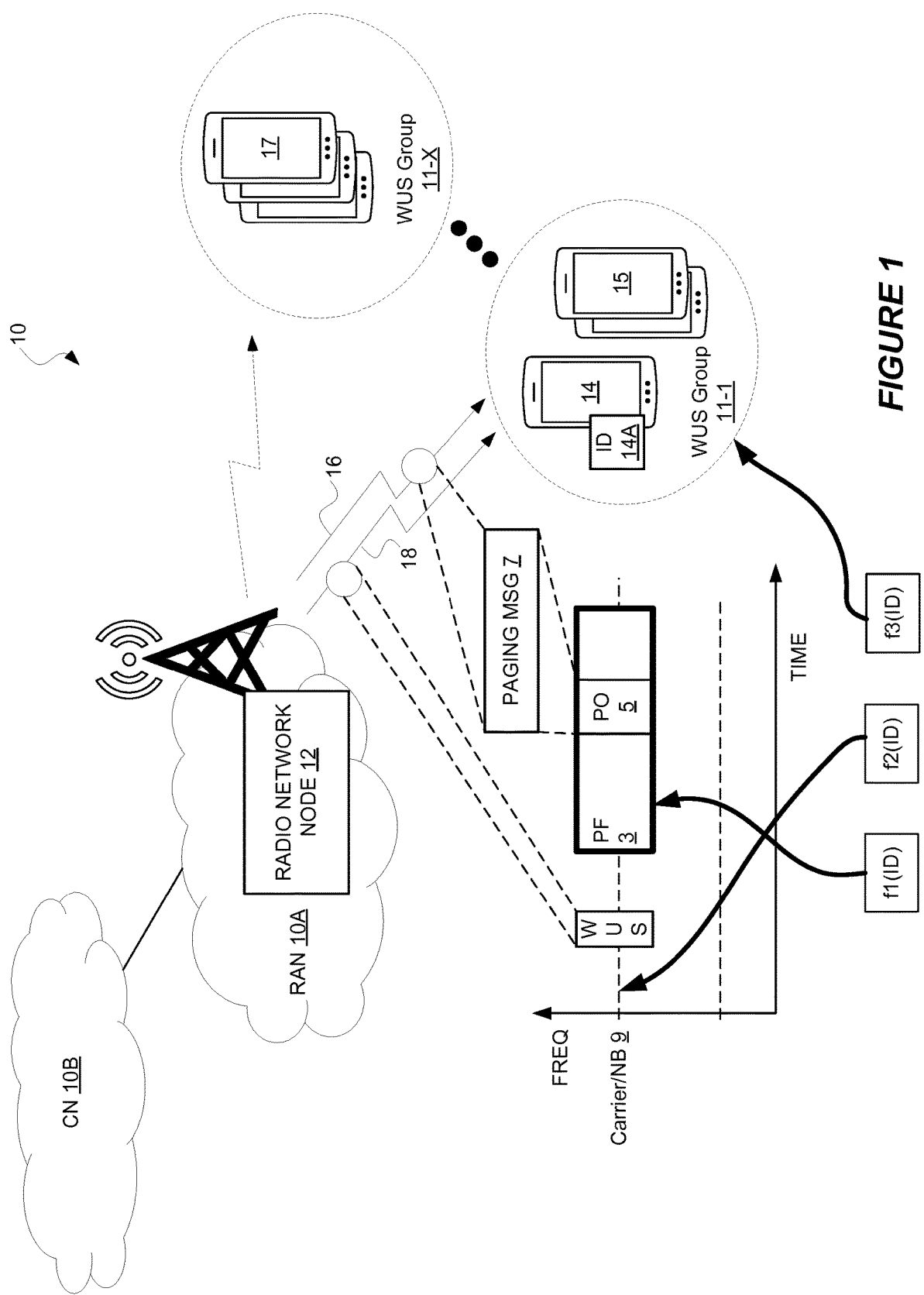
FIG. 1 is a block diagram of a wireless communication system according to some embodiments.

FIG. 1 shows a wireless communication system 10 according to some embodiments. The system 10 includes a radio network node 12 (e.g., a base station) in a radio access network (RAN) 10A portion of the network 10. The network 10 as shown also includes a wireless device 14 configured to wirelessly communicate with the radio network node 12, e.g., for connecting to a core network (CN) 10B portion of the network 10. The core network 10B may in turn connect to one or more data networks (e.g., the Internet).

The wireless device 14 includes one or more receivers (not shown) that are configured for receiving downlink control information (e.g., paging messages) on a downlink control channel 16 from the radio network node 12. The one or more receivers may also be configured for receiving user data on a downlink data channel (not shown). Regardless, the wireless device 14 does not have to continuously monitor the downlink control channel 16 for paging messages. Instead, the wireless device 14 may receive downlink control information on the downlink control channel 16 only discontinuously in time, e.g., according to a discontinuous reception (DRX) mode or DRX configuration of the wireless device 14, which may specify a paging cycle (T). As shown in FIG. 1, for instance, the wireless device 14 is assigned a (periodically recurring) paging frame (PF) 3 as well as a paging occasion (PO) 5 (e.g., lasting one or more subframes) within that paging frame 3. The wireless device 14 may also be assigned a paging carrier or narrowband (NB) 9 on which the paging occasion 5 is to occur. The wireless device 14 accordingly monitors its paging occasion 5 within its paging frame 3 for any paging message 7 intended for the wireless device 14 on its paging carrier or narrowband 9, but need not monitor the downlink control channel 16 for any paging message 7 outside such paging occasion 5.

When the device 14 does not need to monitor the downlink control channel 16, the wireless device 14 is configured to operate in a sleep state in which the device at least partially de-activates some of its hardware, circuitry, and/or other power-consuming resources. For example, the device 14 may at least partially de-activate some of the one or more receivers while sleeping in a sleep state.

The radio network node 12 is configured to awaken the wireless device 14 from a sleep state by transmitting a so-called wake-up signal (WUS) 18 to the device 14. The wake-up signal 18 is a physical signal that indicates the device 14 needs to awaken from a sleep state (or stay awaken) in order to monitor the downlink control channel 16 (e.g., for paging messages). The wake-up signal 18 may be a relatively short signal formed from an a priori known sequence that is detectable with a simple correlator.

In some embodiments, the wireless device 14 may receive the wake-up signal 18 using the same one or more receivers as it uses for receiving the downlink control channel 16, whereas in other embodiments the wireless device 14 may receive the wake-up signal 18 using a so-called wake-up receiver. The wake-up receiver may be particularly designed and/or dedicated for receiving the wake-up signal 18, e.g. as a complement to the one or more other receivers suitable for receiving the downlink control channel 16. The wake-up receiver may for instance comprise a correlator configured to compare a received signal with an a priori known sequence. The wake-up receiver however in some cases may also provide synchronization functionality (e.g., via detecting synchronization sequences), which may enable the device 14 to detect the wake-up signal 18 more accurately. The wake-up receiver in general therefore may be a receiver particularly designed and/or dedicated to detecting one or more predefined sequences (e.g., a wake-up signal sequence and possibly one or more synchronization sequences). For this and other reasons, the wake-up receiver may have a lower requirement analog and radio frequency (RF) circuitry, and thereby power consumption, than the one or more receivers capable of receiving the downlink control channel 16.

No matter the particular type of receiver used for detecting the wake-up signal 18, wireless devices in the system 10 are shown as being distributed into different WUS groups 11-1 . . . 11-X (also referred to as WUS UE groups or WUS device groups). WUS group 11-1 for instance includes wireless device 14 as well as one or more other wireless devices 15, whereas WUS group 11-X includes still other wireless devices 17. By way of these WUS groups, the radio network node 12 is able to selectively wake up wireless devices in a particular WUS group, to the exclusion of wireless devices in other WUS groups. Any given wireless device therefore monitors for a WUS that indicates wireless devices in the WUS group to which it belongs are to wake up (i.e., from a sleep state). The wireless device 14 in particular therefore monitors for a WUS 18 that indicates wireless devices 14, 15 in the WUS group 11-1 to which the wireless device 14 belongs are to wake up.

According to some embodiments herein, a wireless device belongs to a WUS group that is a function of a device identifier for the wireless device, e.g., an international mobile subscriber identifier (IMSI). The function may be different than a function according to which a paging frame of the wireless device is determined from the same device identifier and/or different from a function according to which a paging narrowband or carrier of the wireless device is determined from that same device identifier. This may effectively mean that different (e.g., non-overlapping) portions of the device identifier dictate the device's WUS group, paging frame, and/or paging narrowband or carrier. Some embodiments may thereby ensure that wireless devices with the same paging frame and/or paging narrowband/carrier may nonetheless be distributed over different WUS groups. This may in turn reduce false paging probability, reduce wireless device power consumption, and reduce wireless device processing load and thereby provide benefits such as extended battery lifetime.

As shown in FIG. 1, for instance, the paging frame (PF) 3 of the wireless device 14 (e.g., an index of the PF 3) is a first function f1 of a device identifier (ID) 14A for the wireless device, i.e., f1(ID). The device identifier 14A may for instance be an international mobile subscriber identity (IMSI) for the wireless device 14. Alternatively or additionally, the paging carrier or narrowband 9 of the wireless device 14 (e.g., an index of the carrier or narrowband 9) is a second function f2 of the same device identifier 14A, i.e., f2(ID). And the WUS group 11-1 to which the wireless device 14 belongs (e.g., an index of WUS group 11-1) is a third function f3 of the device identifier 14, i.e., f3(ID). Notably, the third function f3 is different than the first function f1 and/or the second function f2.

In some embodiments, for instance, according to the first function f1 the paging frame 3 of the wireless device 14 depends on a first portion of bits of the device identifier 14A and/or according to the second function f2 the paging narrowband or carrier 9 of the wireless device 14 depends on a second portion of bits of the device identifier 14A. In this case, according to the third function f3 the WUS group 11-1 of the wireless device 14 depends on a third portion of bits of the device identifier 14A that is different than the first portion and/or the second portion. In fact, in some embodiments, the third portion is independent, non-overlapping, and/or uncorrelated with the first portion and/or the second portion. Using different portions of the device identifier 14A in this way may advantageously ensure that wireless devices with the same paging frame and/or paging narrowband/carrier may nonetheless be distributed over different WUS groups.

More particularly, in some embodiments, the first function f1 is equal to SFN mod T=(T div N)*(UE_ID mod N), where SFN is a system frame number of the paging frame of the wireless device, T is a paging cycle of the wireless device, UE_ID is a function of the device identifier, and N is a number of paging frames per paging cycle. And in some embodiments, the second function f2 is equal to floor (UE_ID/(N*Ns)) mod W<W(0)+W(1)+ . . . +W(n), where UE_ID is a function of the device identifier, N is a number of paging frames per paging cycle, Ns is a number of paging occasions per paging frame, and W(i) is a weight applied to a paging carrier i. In other embodiments, the second function f2 is equal to floor(UE_ID/(N*Ns)) mod Nn, where UE_ID is a function of the device identifier, where N is a number of paging frames per paging cycle, where Ns is a number of paging occasions per paging frame, and where Nn is a number of paging narrowbands or carriers.

In these and other embodiments, then, the third function f3 may be equal to floor(floor(UE_ID/(N*Ns))/Nn) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups. In other embodiments, the third function may be equal to floor (UE_ID/(N*Ns*Nn)) mod Nw, where UE_ID is a function of the device identifier, where N is a number of paging frames per paging cycle, where Ns is a number of paging occasions per paging frame, where Nn is a number of paging narrowbands or carriers, and where Nw is a number of WUS groups.

In still other embodiments, the third function f3 is equal to floor(UE_ID/(N*Ns)) mod Nw, where UE_ID is a function of the device identifier, where N is a number of paging frames per paging cycle, where Ns is a number of paging occasions per paging frame, and where Nw is a number of WUS groups. Alternatively, the third function f3 may be equal to floor(UE_ID/Nn) mod Nw, where UE_ID is a function of the device identifier, where Nn is a number of paging narrowbands or carriers, and where Nw is a number of WUS groups.

According to embodiments,
the paging frame 3 of the wireless device 14 depends on a first part of the device identifier/first portion of bits of the device identifier 14A (first function);
the paging narrowband or carrier 9 of the wireless device 14 depends on a second portion of bits of the device identifier 14A (second function).
and the WUS group 11-1 of the wireless device 14 depends on a third portion of bits of the device identifier 14 (third function),
wherein the third portion is different from the first portion and/or the second portion.

In an embodiment, each of the first portion, the second portion and the third portion are different from each other.

In an embodiment, the first portion is non-overlapping with the third portion and/or the second portion is non-overlapping with the third portion.

In an embodiment, the wireless device performs determining the paging frame (3) of the wireless device (14) based on the first function (f1) and determining the paging narrowband or carrier (9) of the wireless device (14) based on the second function (f2), and the WUS group 11-1 based on the third function.

As described above, in an embodiment, the first function operates on the first portion, the second function operates on the second function and the third function operates on the third portion of the device identifier.

In an embodiment, in response to receiving the WUS, the wireless device (14) performs (after awakening from a sleep state) monitoring (240) for a paging message during the paging frame (3) and/or on the paging narrowband or carrier (9); according to embodiments, when the WUS is detected, the wireless device continues to monitor a physical downlink control channel ((M/N)PDCCH) which schedules the paging message on a corresponding Physical Downlink Shared Channel ((N)PDSCH).

Figure 2:
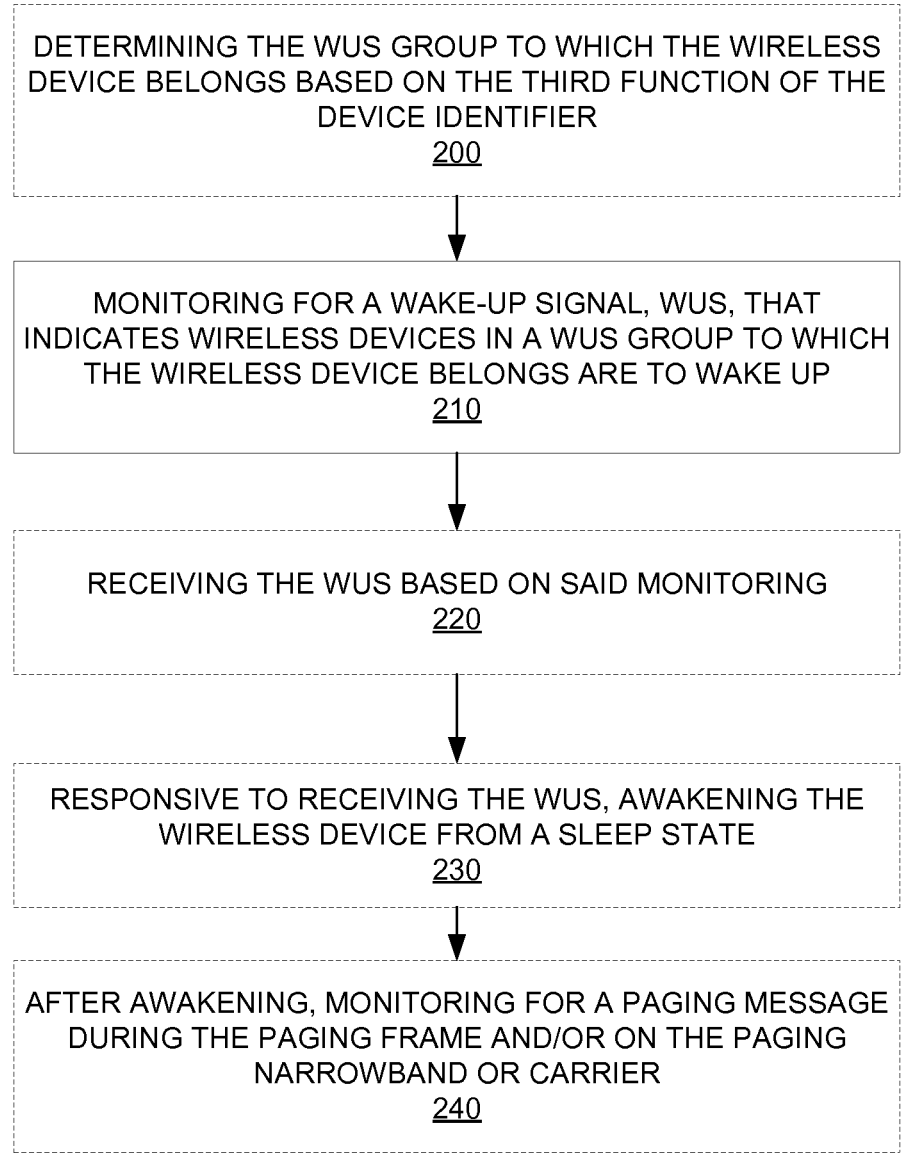
FIG. 2 is a logic flow diagram of a method performed by a wireless device according to some embodiments.

In view of the above, FIG. 2 depicts a method performed by a wireless device 14 configured for use in a wireless communication system 10 in accordance with particular embodiments. The method includes monitoring for a wake-up signal, WUS, 18 that indicates wireless devices in a WUS group 11-1 to which the wireless device 14 belongs are to wake up (Block 210). In some embodiments, a paging frame 3 of the wireless device 14 is a first function f1 of a device identifier 14A for the wireless device 14 and/or a paging narrowband or carrier 9 of the wireless device 14 is a second function f2 of the device identifier 14A. In this case, the WUS group 11-1 to which the wireless device 14 belongs is a third function f3 of the device identifier 14A that is different than the first function f1 and/or the second function f2.

In some embodiments, according to the first function f1 the paging frame 3 of the wireless device 14 depends on a first portion of bits of the device identifier 14A and/or according to the second function f2 the paging narrowband or carrier 9 of the wireless device 14 depends on a second portion of bits of the device identifier 14A. In this case, according to the third function f3 the WUS group 11-1 of the wireless device 14 depends on a third portion of bits of the device identifier 14A that is different than the first portion and/or the second portion. In one such embodiment, the third portion is independent, non-overlapping, and/or uncorrelated with the first portion and/or the second portion.

In some embodiments, the device identifier 14A is an IMSI for the wireless device 14.

In some embodiments, the third function f3 is a function of at least: the device identifier 14A; and either a number of paging narrowbands or a total weight across paging carriers.

In some embodiments, the third function f3 is a function of at least the device identifier 14A, a number of paging frames per paging cycle, and a number of paging occasions per paging frame.

In some embodiments, the third function is equal to floor(floor(UE_ID/(N*Ns))/Nn) mod Nw, where UE_ID is a function of the device identifier 14A, where N is a number of paging frames per paging cycle, where Ns is a number of paging occasions per paging frame, where Nn is a number of paging narrowbands or carriers, and where Nw is a number of WUS groups. In other embodiments, the third function f3 is equal to floor(UE_ID/(N*Ns*Nn)) mod Nw, where UE_ID is a function of the device identifier 14A, where N is a number of paging frames per paging cycle, where Ns is a number of paging occasions per paging frame, where Nn is a number of paging narrowbands or carriers, and where Nw is a number of WUS groups. In still other embodiments, the third function f3 is equal to floor(UE_ID/(N*Ns)) mod Nw, where UE_ID is a function of the device identifier 14A, where N is a number of paging frames per paging cycle, where Ns is a number of paging occasions per paging frame, and where Nw is a number of WUS groups. In yet other embodiments, the third function f3 is equal to floor(UE_ID/Nn) mod Nw, where UE_ID is a function of the device identifier 14A, where Nn is a number of paging narrowbands or carriers, and where Nw is a number of WUS groups.

In some embodiments, the method also includes determining the WUS group 11-1 to which the wireless device 14 belongs based on the third function f3 of the device identifier 14A (Block 200).

Although not shown, the method in some embodiments may further comprise determining the paging frame 3 of the wireless device 14 based on the first function f3 of the device identifier 14A. Alternatively or additionally, the method may further comprise determining the paging narrowband or carrier 9 of the wireless device 14 based on the second function f2 of the device identifier 14A.

Alternatively or additionally, the method in some embodiments includes receiving the WUS 18 based on said monitoring (Block 220), and responsive to receiving the WUS 18, awakening the wireless device 14 from a sleep state (Block 230). The method may also include, after awakening, monitoring for a paging message 7 during the paging frame 3 and/or on the paging narrowband or carrier 9 (Block 240).

In some embodiments, the first function f1 is equal to SFN mod T=(T div N)*(UE_ID mod N), where SFN is a system frame number of the paging frame 3 of the wireless device 14, T is a paging cycle of the wireless device 14, UE_ID is a function of the device identifier 14A, and N is a number of paging frames per paging cycle.

In some embodiments, the second function f2 is equal to floor(UE_ID/(N*Ns)) mod W<W(0)+W(1)+ . . . +W(n), where UE_ID is a function of the device identifier 14A, N is a number of paging frames per paging cycle, Ns is a number of paging occasions per paging frame, and W(i) is a weight applied to a paging carrier i. In other embodiments, the second function f2 is equal to floor(UE_ID/(N*Ns)) mod Nn, where UE_ID is a function of the device identifier 14A, where N is a number of paging frames per paging cycle, where Ns is a number of paging occasions per paging frame, and where Nn is a number of paging narrowbands or carriers.

In some embodiments, the first, second, and third functions are functions of UE_ID, wherein UE_ID is equal to the device identifier 14A modulus an integer X.

Figure 3:
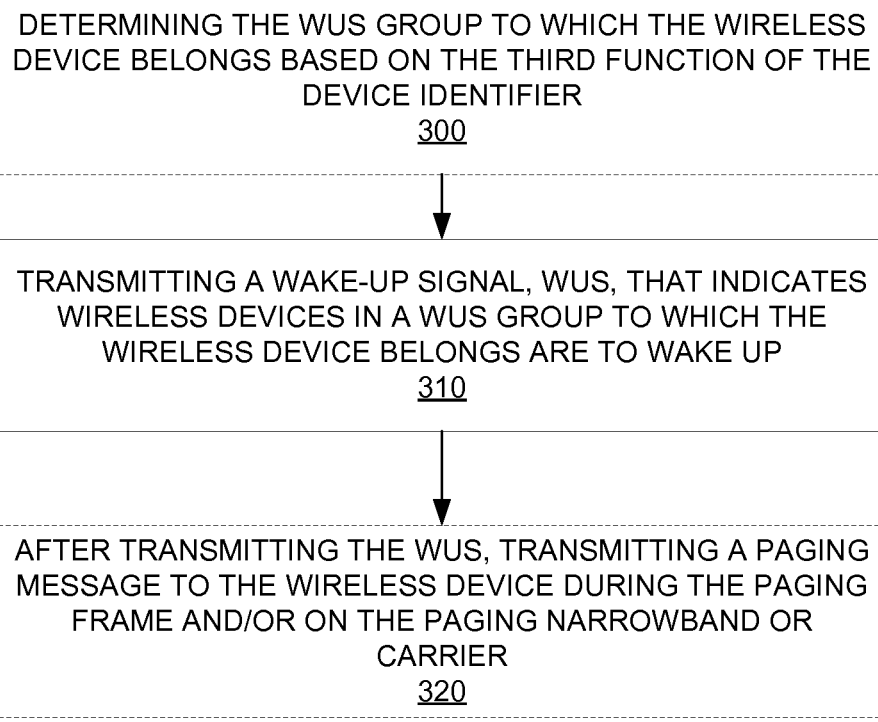
FIG. 3 is a logic flow diagram of a method performed by a radio network node according to some embodiments.

FIG. 3 depicts a method performed by a radio network node 12 configured for use in a wireless communication system in accordance with other particular embodiments. The method includes transmitting a wake-up signal, WUS, 18 that indicates wireless devices in a WUS group 11-1 to which a wireless device 14 belongs are to wake up (Block 310). In some embodiments, a paging frame 3 of the wireless device 14 is a first function f1 of a device identifier 14A for the wireless device 14 and/or a paging narrowband or carrier 9 of the wireless device 14 is a second function f2 of the device identifier 14A. In this case, the WUS group 11-1 to which the wireless device 14 belongs is a third function f3 of the device identifier 14A that is different than the first function f1 and/or the second function f2.

In some embodiments, the method also includes determining the WUS group 11-1 to which the wireless device 14 belongs based on the third function f3 of the device identifier 14A (Block 300).

Alternatively or additionally, the method in some embodiments includes, after transmitting the WUS 18, transmitting a paging message 7 to the wireless device 14 during the paging frame 3 and/or on the paging narrowband or carrier 9 (Block 320).

In some embodiments, according to the first function f1 the paging frame 3 of the wireless device 14 depends on a first portion of bits of the device identifier 14A and/or according to the second function f2 the paging narrowband or carrier 9 of the wireless device 14 depends on a second portion of bits of the device identifier 14A. In this case, according to the third function f3 the WUS group 11-1 of the wireless device 14 depends on a third portion of bits of the device identifier 14A that is different than the first portion and/or the second portion. In one such embodiment, the third portion is independent, non-overlapping, and/or uncorrelated with the first portion and/or the second portion.

In some embodiments, the device identifier 14A is an IMSI for the wireless device 14.

In some embodiments, the third function f3 is a function of at least: the device identifier 14A; and either a number of paging narrowbands or a total weight across paging carriers.

In some embodiments, the third function f3 is a function of at least the device identifier 14A, a number of paging frames per paging cycle, and a number of paging occasions per paging frame.

In some embodiments, the third function is equal to floor(floor(UE_ID/(N*Ns))/Nn) mod Nw, where UE_ID is a function of the device identifier 14A, where N is a number of paging frames per paging cycle, where Ns is a number of paging occasions per paging frame, where Nn is a number of paging narrowbands or carriers, and where Nw is a number of WUS groups. In other embodiments, the third function f3 is equal to floor(UE_ID/(N*Ns*Nn)) mod Nw, where UEID is a function of the device identifier 14A, where N is a number of paging frames per paging cycle, where Ns is a number of paging occasions per paging frame, where Nn is a number of paging narrowbands or carriers, and where Nw is a number of WUS groups. In still other embodiments, the third function f3 is equal to floor(UE_ID/(N*Ns)) mod Nw, where UE_ID is a function of the device identifier 14A, where N is a number of paging frames per paging cycle, where Ns is a number of paging occasions per paging frame, and where Nw is a number of WUS groups. In yet other embodiments, the third function f3 is equal to floor(UE_ID/Nn) mod Nw, where UE_ID is a function of the device identifier 14A, where Nn is a number of paging narrowbands or carriers, and where Nw is a number of WUS groups.

Although not shown, the method in some embodiments may further comprise determining the paging frame 3 of the wireless device 14 based on the first function f3 of the device identifier 14A. Alternatively or additionally, the method may further comprise determining the paging narrowband or carrier 9 of the wireless device 14 based on the second function f2 of the device identifier 14A.

In some embodiments, the first function f1 is equal to SFN mod T=(T div N)*(UE_ID mod N), where SFN is a system frame number of the paging frame 3 of the wireless device 14, T is a paging cycle of the wireless device 14, UE_ID is a function of the device identifier 14A, and N is a number of paging frames per paging cycle.

In some embodiments, the second function f2 is equal to floor(UE_ID/(N*Ns)) mod W<W(0)+W(1)+ . . . +W(n), where UE_ID is a function of the device identifier 14A, N is a number of paging frames per paging cycle, Ns is a number of paging occasions per paging frame, and W(i) is a weight applied to a paging carrier i. In other embodiments, the second function f2 is equal to floor(UE_ID/(N*Ns)) mod Nn, where UE_ID is a function of the device identifier 14A, where N is a number of paging frames per paging cycle, where Ns is a number of paging occasions per paging frame, and where Nn is a number of paging narrowbands or carriers.

In some embodiments, the first, second, and third functions are functions of UE_ID, wherein UE_ID is equal to the device identifier 14A modulus an integer X.

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device 14 is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12 configured to perform any of the steps of any of the embodiments described above for the radio network node.

Embodiments also include a radio network node 12 comprising processing circuitry and power supply circuitry. The processing circuitry is configured to perform any of the steps of any of the embodiments described above for the radio network node 12. The power supply circuitry is configured to supply power to the radio network node 12.

Embodiments further include a radio network node 12 comprising processing circuitry. The processing circuitry is configured to perform any of the steps of any of the embodiments described above for the radio network node 12. In some embodiments, the radio network node 12 further comprises communication circuitry.

Embodiments further include a radio network node 12 comprising processing circuitry and memory. The memory contains instructions executable by the processing circuitry whereby the radio network node is configured to perform any of the steps of any of the embodiments described above for the radio network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
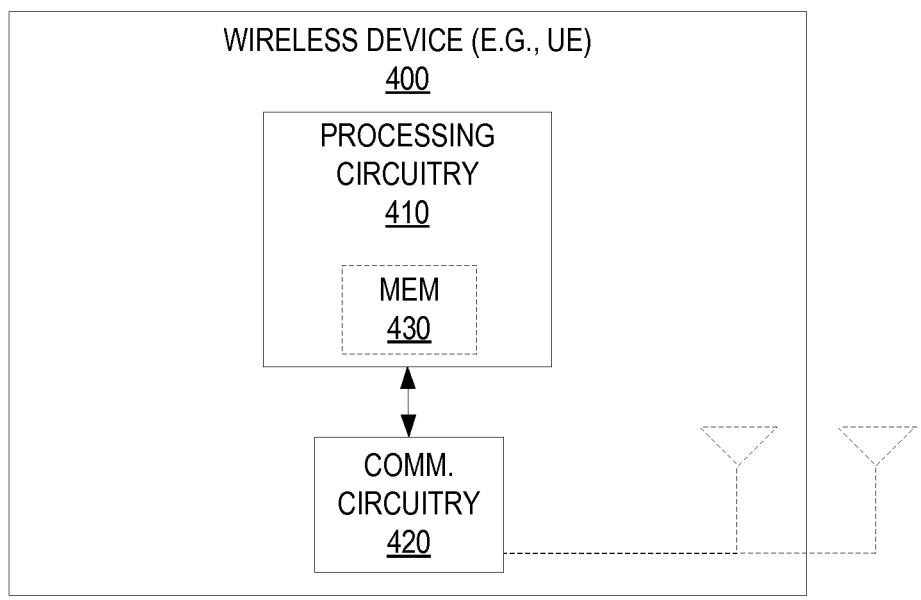
FIG. 4 is a block diagram of a wireless device according to some embodiments.

FIG. 4 for example illustrates a wireless device 400 (e.g., wireless device 14) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIG. 2, such as by executing instructions stored in memory 430. The processing circuitry 410 in this regard may implement certain functional means, units, or modules.

Figure 5:
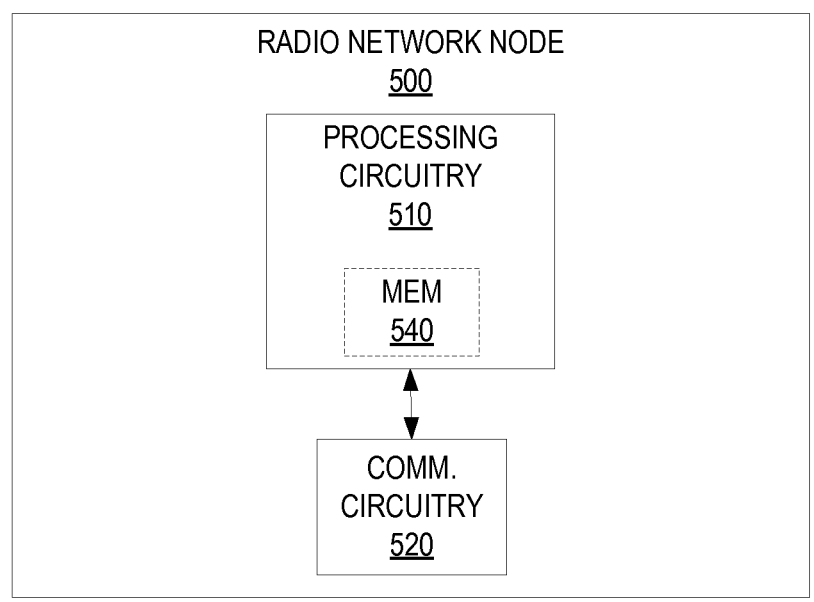
FIG. 5 is a block diagram of a radio network node according to some embodiments.

FIG. 5 illustrates a radio network node 500 (e.g., radio network node 12) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 3, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. For example, some of the below embodiments illustrate applications of FIGS. 1, 2-3, and 4-5 as applied to an eMTC or NB-IoT context, e.g., such that wireless device 14 above is an eMTC user equipment (UE) or an NB-IoT UE. The below reference to an eMTC UE, NB-IoT UE, or UE in general may therefore be a specific example implementation of wireless device 14 above.

There has been a lot of work in 3GPP on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

The LTE enhancements introduced in 3GPP Release 13,14 and 15 for MTC will be referred to as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some differences include a new physical channel, such as the physical downlink control channels (PDCCHs), called MPDCCH in eMTC and NPDCCH in NB-IoT, and a physical random access channel (PRACH) referred to as narrowband PRACH (NPRACH) for NB-IoT. Another difference is the coverage level (also known as coverage enhancement level) that these technologies can support. By applying repetitions to the transmitted signals and channels, both eMTC and NB-IoT allow UE operation down to much lower SNR level compared to LTE, i.e. $Es/Iot \geq -15$ dB being the lowest operating point for eMTC and NB-IoT which can be compared to −6 dB Es/IoT for "legacy" LTE.

For both NB-IoT and Rel-15 enhancements for eMTC, it is an objective to further reduce latency and power consumption. Regarding physical power consumption reduction for physical channels, there may be specified for idle mode paging and/or connected mode DRX, a physical signal/channel that can be efficiently decoded or detected prior to decoding NPDCCH/NPDSCH (where NPDSCH refers to the narrowband physical downlink shared channel). Similarly for eMTC, there may be specified for idle mode paging and/or connected mode DRX, a physical signal/channel that can be efficiently decoded or detected prior to decoding the physical downlink control/data channel.

A 'Wake-up signal' (WUS) is based on the transmission of a short signal that indicates to the UE that it should continue to decode the downlink (DL) control channel e.g. full NPDCCH for NB-IoT. If such signal is absent (discontinuous transmission, DTX, i.e. UE does not detect it) then the UE can go back to sleep without decoding the DL control channel. The decoding time for a WUS is considerably shorter than that of the full NPDCCH since it essentially only needs to contain one bit of information whereas the NPDCCH may contain up to 35 bits of information. This, in turn, reduces UE power consumption and leads to longer UE battery life. The 'Wake-up signal' (WUS) would be transmitted only when there is paging for the UE. But if there is no paging for the UE then the WUS will not be transmitted (i.e., implying a discontinuous transmission, DTX) and the UE would go back to sleep e.g. upon detecting DTX instead of WUS. This is illustrated in FIG. 6Error! Reference source not found., where white blocks indicate possible WUS and PO positions whereas the black boxes indicate actual WUS and PO positions.

The specification of Rel-15 WUS is spread out over several parts of the LTE 36-series standard, e.g., Technical Specifications (TSs) 36.211, 36.213, 36.304 and 36.331. The sequence is e.g., defined in TS 36.211 as follows:

The NWUS sequence w(m) in subframe x=0,1, ..., M−1 is defined by $$w(m) = \theta_{n_f,n_s}(m') \cdot e^{-\frac{j\pi un(n+1)}{131}}$$

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 1 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$u = (N_{ID}^{Ncell} \bmod 126) + 3$$

where M is the actual duration of NWUS as defined in 3GPP TS 36.213.

The scrambling sequence $c_{n_f,n_s}(i)$, i=0, 1, ..., 2·132M−1 is given by clause 7.2, and shall be initialized at the start of the NWUS with $$c_{init\_WUS} = (N_{ID}^{Ncell} + 1)\left(\left(10 n_{f\_start\_PO} + \left\lfloor \frac{n_{s\_start\_PO}}{2} \right\rfloor\right) \bmod 2048 + 1\right) 2^9 + N_{ID}^{Ncell}$$

where $n_{f\_start\_PO}$ is the first frame of the first PO to which the NWUS is associated, and $n_{s\_start\_PO}$ is the first slot of the first PO to which the NWUS is associated.

And further:

... the NWUS sequence w(m) shall be mapped to resource elements (k, l) in sequence, starting with w(0) in increasing order of first the index k=0,1, ..., $N_{sc}^{RB}$−1, over the 12 assigned subcarriers and then the index l=3, 4, ..., $2N_{symb}^{DL}$−1 in each subframe in which NWUS is transmitted.

As is evident from the equations above, the WUS sequence is only dependent on the time instant of the PO to which it is associated and the eNB cell id. That implies that it is not possible to further distinguish which UE(s) that is paged among the UEs belonging to the same PO. In most cases only a single UE is paged at a time, in which case the remaining UEs will unnecessarily monitor the subsequent MPDCCH.

Accordingly, the WUS should be further developed to also include UE grouping, such that the number of UEs that are sensitive to the WUS is further narrowed down to a smaller subset of the UEs that are associated with a specific paging occasion (PO). For machine-type communications for bandwidth-reduced low complexity (BL)/coverage enhancement (CE) user equipments (UEs), downlink transmission efficiency and/or UE power consumption may be improved by specifying a UE-group WUS.

The Rel-15 WUS was designed such that all UEs belongs to the same group. That is, a transmitted WUS associated to a specific paging occasion (PO) may wake-up all UEs that are configured to detect paging at that PO. Hence, all UEs which are not targeted by the page will wake up unnecessarily.

Both eMTC and NB-IoT have been developed with varying applications in mind. Contrary to the mobile broadband (MBB) use case, the IoT realm has widely different use cases in terms of e.g., paging rates, latency, baseband processing power, etc. In one network, a power switch for street lights may be deployed and effectively paged once daily, with resulting extremely low paging rates. In another network, a machine controlling device may be paged on a second basis. For these two networks, it is apparent that paging will differ substantially, and, consequently, that the same UE-grouping configuration may be ill-suited.

The Rel-16 WUS UE grouping may be based on UE_ID, where UE_ID is a function of a UE's international mobile subscriber identifier (IMSI). In particular, at least UE_ID based grouping may be supported for UE-Group based WUS. This doesn't exclude other options. UE grouping may be based on at least UE ID or some function of UE ID. In other words, group WUS may be based on at least legacy WUS and UE-group ID. In some embodiments, configuration of group WUS is at least signaled in System Information (SI). For NB-IoT, the number of UE groups may be configured by a SI block (SIB).

Figure 7:
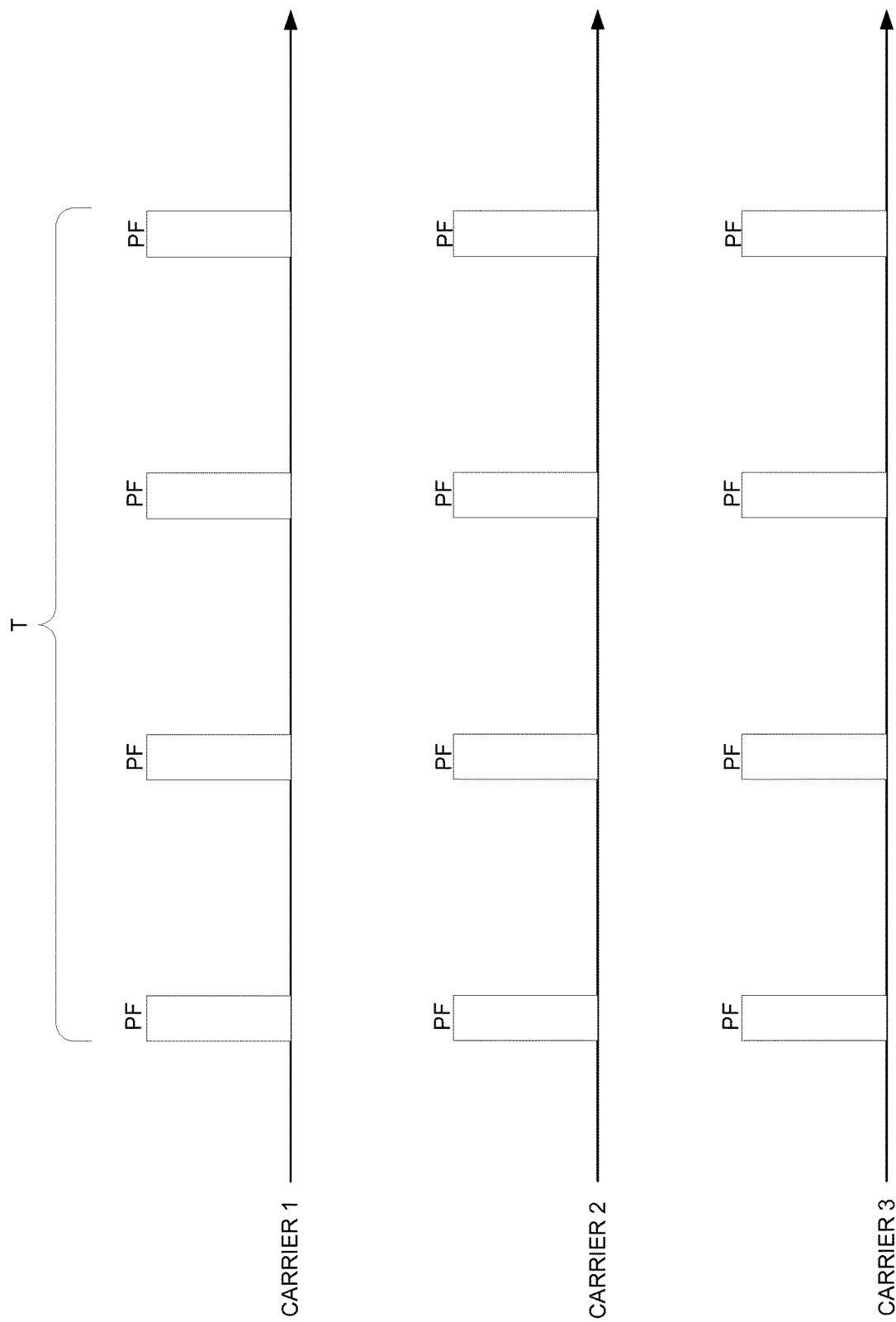
FIG. 7 is a block diagram of paging frames and paging carriers according to some embodiments.

There currently exist certain challenge(s) regarding how the UE_ID may be used to distribute UEs over WUS UE groups. In legacy (Rel-13, Rel-14, and Rel-15) operation, UEs are distributed over Paging Frames (PFs) and paging narrowbands (LTE-M) or paging carriers (NB-IoT) using bits from IMSI. See FIG. 7. Problematically, UEs that already share a Paging Frame (PF) and paging narrowband/carrier are likely to all end up in the same WUS group, leaving all other WUS groups empty and the Rel-16 WUS feature useless.

Certain aspects of the present disclosure and their embodiments may provide solutions to these or other challenges. Some embodiments ensure that other IMSI-bits than used for the distribution of UEs over Paging Frames and paging narrowband/carrier are used when distributing UEs over WUS groups. Some embodiments do so using the following equation: WUSgroup=floor(floor(UE_ID/N*Ns)/Nn) mod Nw. Here, UE_ID is a function of the device identifier 14A, N is a number of paging frames per paging cycle, Ns is a number of paging occasions per paging frame, Nn is a number of paging narrowbands or carriers, and Nw is a number of WUS groups. Some embodiments thereby provide a solution for distributing UEs over WUS groups based on UE_ID.

Certain embodiments advantageously uniformly distribute UEs over Rel-16 WUS groups. This may in turn reduce false paging probability, reduce wireless device power consumption, and reduce wireless device processing load and thereby provide benefits such as extended battery lifetime. Uniformly distributed UEs over WUS groups in this way, so as to reduce false paging, may maximize power reduction gains for Rel-16 group WUS in comparison to Rel-15 WUS.

More particularly, according to some embodiments, the UE_ID determines the system frame number (SFN) of the paging frame (PF) of a UE according to the following equation:

SFN mod T=(T div N)*(UE_ID mod N)

Here, T is a paging cycle of the wireless device 14.

The paging occasions (POs) in this radio frame are then determined by the parameter i_s:

i_s=floor(UE_ID/N) mod Ns with the subframes then pointed out by the corresponding tables below. Frequency Division Duplexing (FDD):

If Paging Radio Network Temporary Identifier (P-RNTI) is transmitted on PDCCH or NPDCCH, or if P-RNTI is transmitted on MPDCCH with system bandwidth>3 MHz:

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

If P-RNTI is transmitted on MPDCCH with system bandwidth of 1.4 MHz and 3 MHz:

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

Time Division Duplexing (TDD) (All UL/DL Configurations):
If P-RNTI is transmitted on PDCCH or NPDCCH, or if P-RNTI is transmitted on MPDCCH with system bandwidth>3 MHz:

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

If P-RNTI is transmitted on MPDCCH with system bandwidth of 1.4 MHz and 3 MHz:

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

As seen, other UE_ID bits are used for determining i_s such that, in principle, UEs are distributed in different POs. However, since nB/T is the PO density per radio frame, nB values 2T or 4T are unlikely to be used in combination with the coverage enhancements for NB LTE-M and NB-IoT. That is, it is not practical to use every radio frame as paging frame when using repetitions. Therefore, LTE-M and NB-IoT which share the PF will typically also share the PO. Hence there would be no gains at all compared to Rel-15 WUS.

When paging over narrowbands (LTE-M) and non-anchor carriers (NB-IoT) were introduced, the number of bits used from IMSI was also increased such that UE_ID=IMSI mod 16384.

Consider now NB-IoT in particular. In Rel-13 NB-IoT, paging of UEs is performed on the downlink anchor carrier. One carrier is 1 Physical Resource Block (PRB), i.e. 180 KHz. Rel-13 supports multi-PRB operation, where other carriers are configured, but UEs can only be assigned to those during the connected session, i.e. while in RRC_CONNECTED state. That is, all RRC_IDLE mode operations are performed on the downlink and uplink anchor carriers respectively (only FDD is supported in Rel-13).

In Rel-14, support for paging and random access is introduced on non-anchor carriers to be able to distribute the paging and random access load over all used carriers. This means that NPRACH and PCCH can be configured also for non-anchor carriers, which are then used by UEs and eNB for random access and paging accordingly.

In Rel-15 the wake-up signal (WUS) was introduced in order to reduce UE power consumption. The WUS monitoring is shorter, and hence less energy consuming for the UE, than to monitor the (M/N)PDCCH for paging. The WUS is only transmitted if the UE, or any other UE sharing the same paging occasion (PO), is being paged. If WUS is detected, the UE will continue to monitor (M/N)PDCCH for paging and read the Downlink Control Information (DCI) containing the downlink assignment to the (N)PDSCH transmission carrying the paging message. It is specified that the WUS is transmitted in the carrier (or narrowband for LTE-M) where the UE is being paged.

In Rel-16, more information is added to the WUS to indicate that only part of the UEs sharing a PO are being paged. That is, the false paging probability is reduced. One problem is that Rel-16 UEs cannot be woken up by the Rel-15 WUS signal, and the Rel-16 WUS signal cannot be altered in order to be backwards compatible. In the following paragraphs, WUS may be used for the Rel-15 WUS, and GWUS (stands for group WUS) may be used for the Rel-16 WUS. Notice there can be Rel-16 UEs that do not support WUS or GWUS, as the support of WUS or GWUS can be an optional UE capability.

The paging carrier in NB-IoT is determined based on UE_ID in the following way. The index for the paging carrier of a UE is the lowest value that fulfills the following equation, where W are the paging weights for the paging carriers:

$$\text{floor}(UE\_ID/(N*Ns)) \bmod W < W(0) + W(1) + \ldots + W(n)$$

Consider now LTE-M. The above description is for NB-IoT; LTE-M works differently. In LTE-M, several 'narrowbands' can be defined, where each narrowband is corresponding to 6 PRBs (non-overlapping). A UE will only monitor MPDCCH in one narrowband at a time but frequency hopping is applied according to a specified pattern. The start position, i.e. the starting narrowband for paging, is however defined based on UE_ID and allows for better frequency multiplexing of the UEs and the paging load.

According to TS 36.304, the UE is assigned a paging narrowband by the following equation (Nn=paging-narrow-Bands):

$$PNB = \text{floor}(UE\_ID/(N*Ns)) \bmod Nn$$

Further, the number of narrowbands that can be supported by a certain system bandwidth is given by the table below:

| System BW (MHz) | #PRBs | Fixed # narrowbands |
|---|---|---|
| 1.4 | 6 | 1 |
| 3 | 15 | 2 |
| 5 | 25 | 4 |
| 10 | 50 | 8 |
| 15 | 75 | 12 |
| 20 | 100 | 16 |

So, for example, when determining in which narrowband for LTE-M, and in which carrier for NB-IoT, the UE is to be paged, it is avoided that all UEs sharing PO ended up in the same narrowband or carrier:

$$PNB = \text{floor}(UE\_ID/(N*Ns)) \bmod Nn$$

$$\text{floor}(UE\_ID/(N*Ns)) \bmod W < W(0) + W(1) + \ldots + W(n)$$

Taking the paging narrowband (PNB) as the example, the UEs are first spread over the N PFs used in the cell for the DRX cycle T. Then, as for i_s the other bits of the UE_ID are used to determine the PNB. For example, if T=256 and nB=T/64, then N=4 and UEs will spread over 4 PFs in the 256 radio frame long DRX cycle. Two UEs with UE_ID1=15914 and UE_ID2=4690 will then share a PF since UE_ID mod N=2. However if there are 5 narrowbands in the cell such that Nn=5, the division with N in the PNB equation above ensures that the UEs will be distributed to different paging narrowbands, PNB1=3 and PNB2=2.

In some embodiments, for group WUS, the WUS will be transmitted in the same narrowband or carrier as the paging message. For example, UE-groups WUSs are only multiplexed in the same NB as the associated PO. And UE-group WUSs are only multiplexed in the same carrier as the associated PO.

Figure 8:
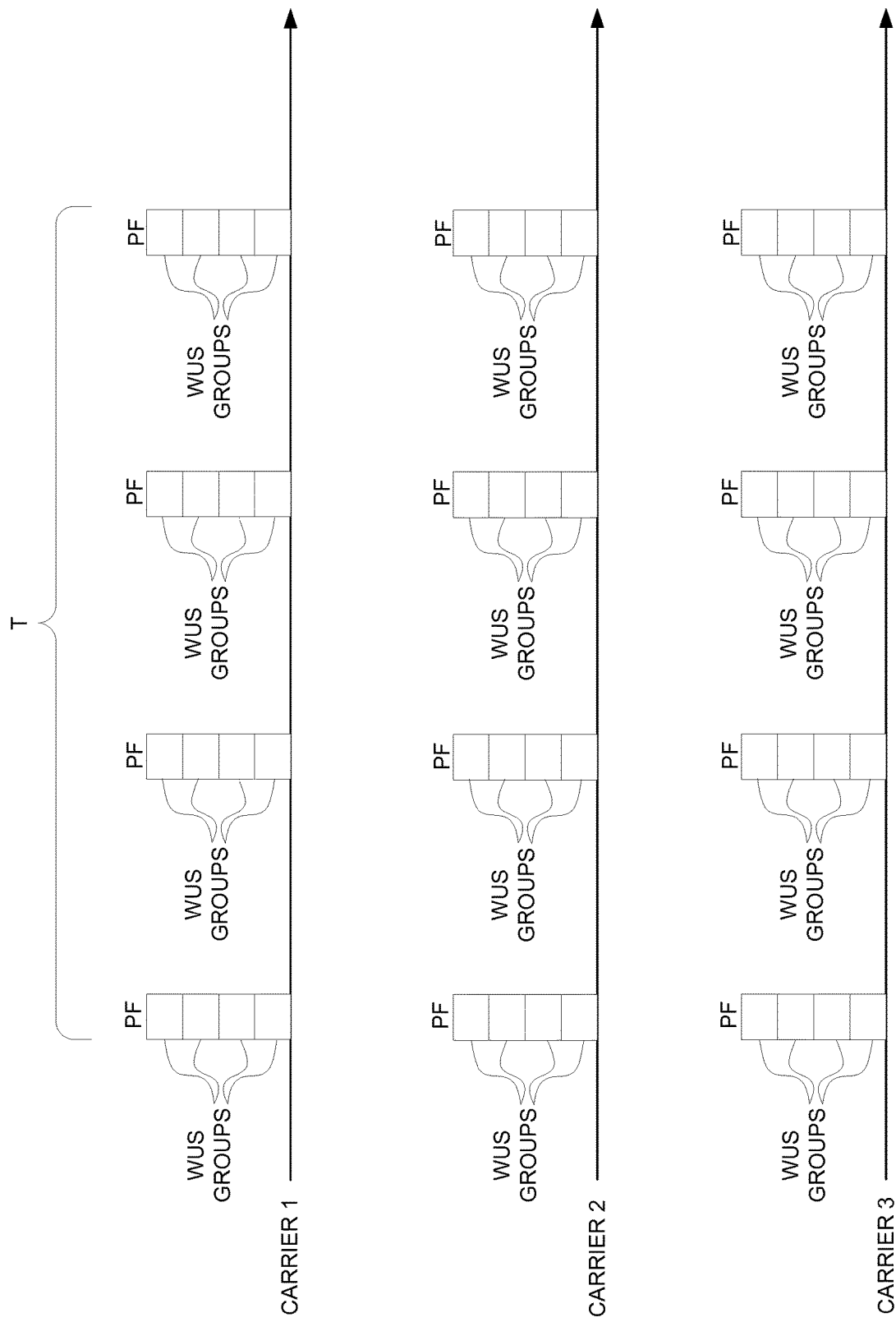
FIG. 8 is a block diagram of paging frames, paging carriers, and wake-up signal (WUS) groups according to some embodiments.

Consider now some embodiments in view of the above. Some embodiments ensure that UEs that are already sharing a Paging Frame (PF) and narrowband/paging carrier are not all put in the same WUS group, e.g., so as to distribute UEs over WUS groups as shown in FIG. 8. Specifically, FIG. 8 illustrates distribution of UEs over paging frames (PFs), paging carriers, and WUS groups for nB=4. In one such embodiment, UEs may be uniformly distributed first over PFs, then over paging narrowbands/carriers, and last over WUS groups. This may be achieved by using different bits of the IMSI than for the determination of the PF or narrowband/paging carrier. One embodiment for instance distributes UEs in WUS groups according to the following equation:

$$WUSgroup = \text{floor}(\text{floor}(UE\_ID/(N*Ns))/Nn) \bmod Nw$$

This embodiment achieves the above by dividing with the number used in the modulus operation for the previous distribution. Or alternatively:

$$WUSgroup = \text{floor}(UE\_ID/(N*Ns*Nn)) \bmod Nw$$

In another embodiment, other IMSI-bits than used for determining the PF are used for determining the WUS group. That is, it is ensured that UEs sharing a PF are distributed in different WUS groups, but they can still be located in the same paging narrowband/carrier. An equation for this would be similar to the following:

$$WUSgroup = \text{floor}(UE\_ID/(N*Ns)) \bmod Nw$$

In another embodiment, other IMSI-bits than used for determining the paging narrowband/carrier are used for determining the WUS group. That is, it is ensured that UEs sharing a paging narrowband/carrier are distributed in different WUS groups, but they can still be located in the same PF. An equation for this would be similar to the following:

$$WUSgroup = \text{floor}(UE\_ID/Nn) \bmod Nw$$

In the above, Nw is the number of WUS groups and would typically be confined to values of $2^n$.

Some embodiments use more bit from IMSI, e.g., using a larger number than 16384.

In alternative embodiments, another UE_ID number than IMSI is used, e.g. (Serving) Temporary Mobile Subscriber Identity ((S-)TMSI).

The description above is for LTE-M and NB-IoT, but may alternatively or additionally equally be applied to New Radio (NR) (or any other radio access technology).

According to some embodiments, the WUS UE group may determine the WUS sequence, e.g., such that different WUS sequences are used for different WUS UE groups. Alternatively or additionally, the WUS UE group may determine the radio resource mapping of the WUS, e.g., such that a WUS is mapped onto different radio resources (e.g., time-frequency resources, such as physical radio blocks, PRBs) for different WUS groups.

Figure 9:
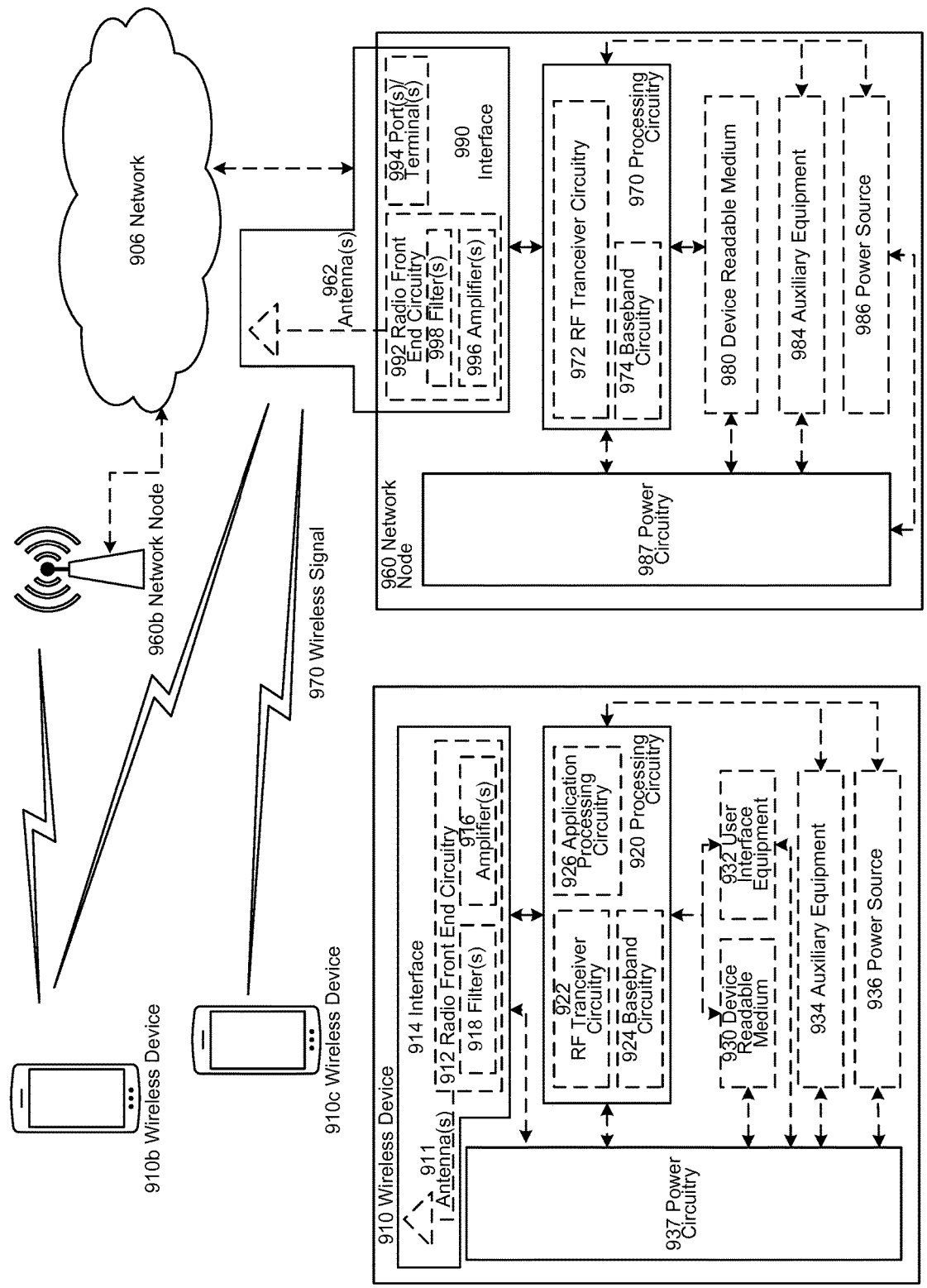
FIG. 9 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
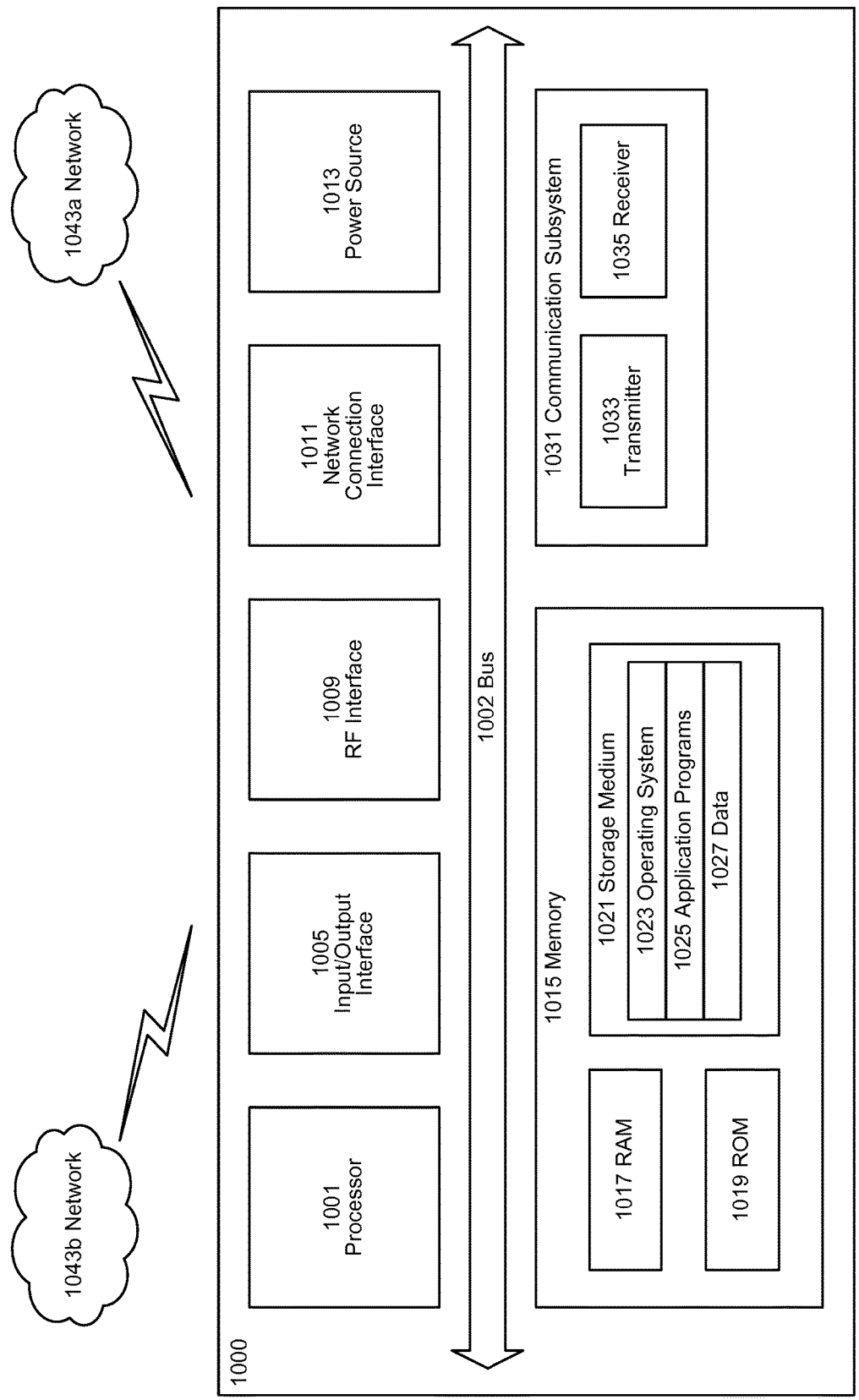
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3$^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
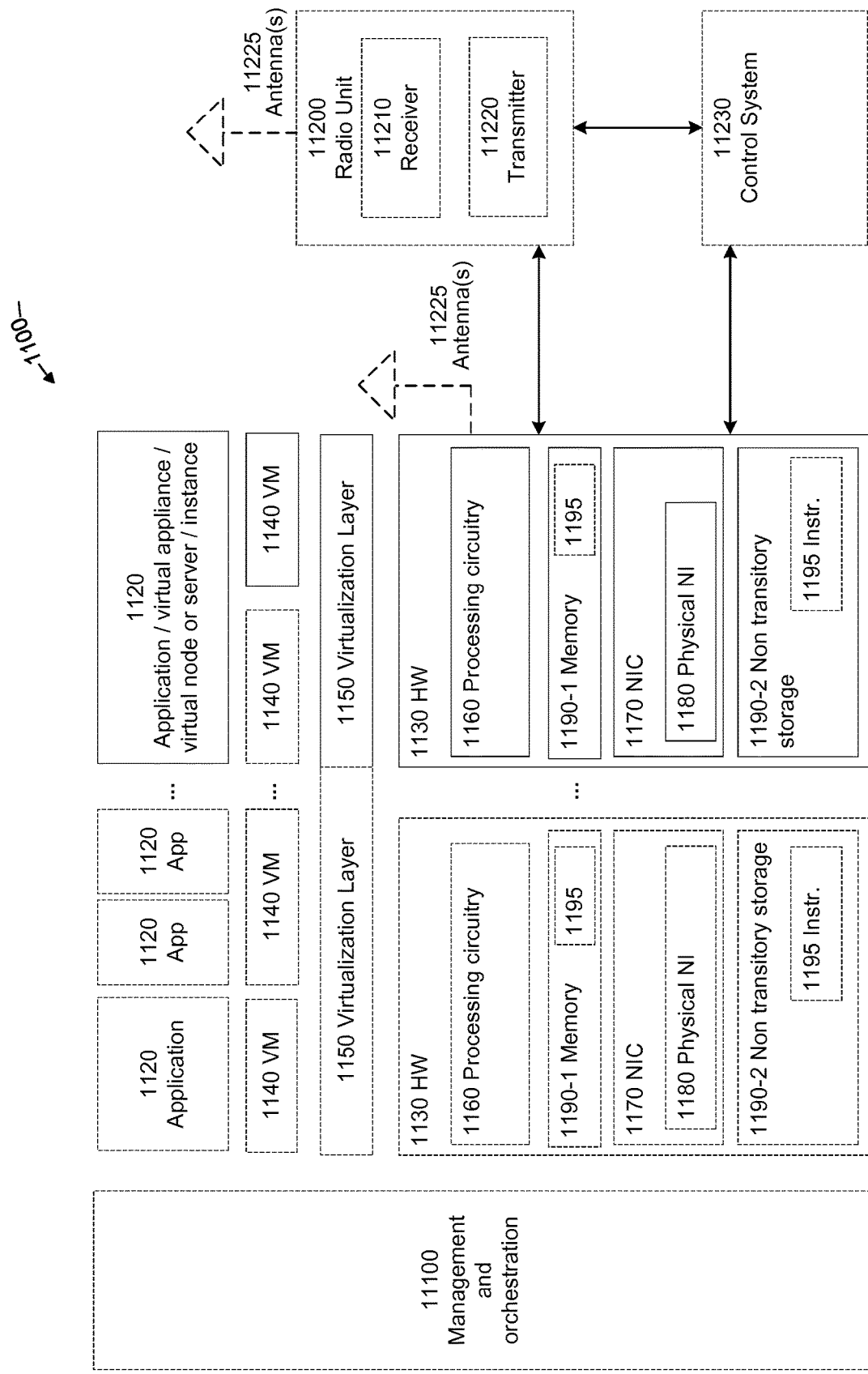
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 11230 which may alternatively be used for communication between the hardware nodes 1130 and radio units 11200.

Figure 12:
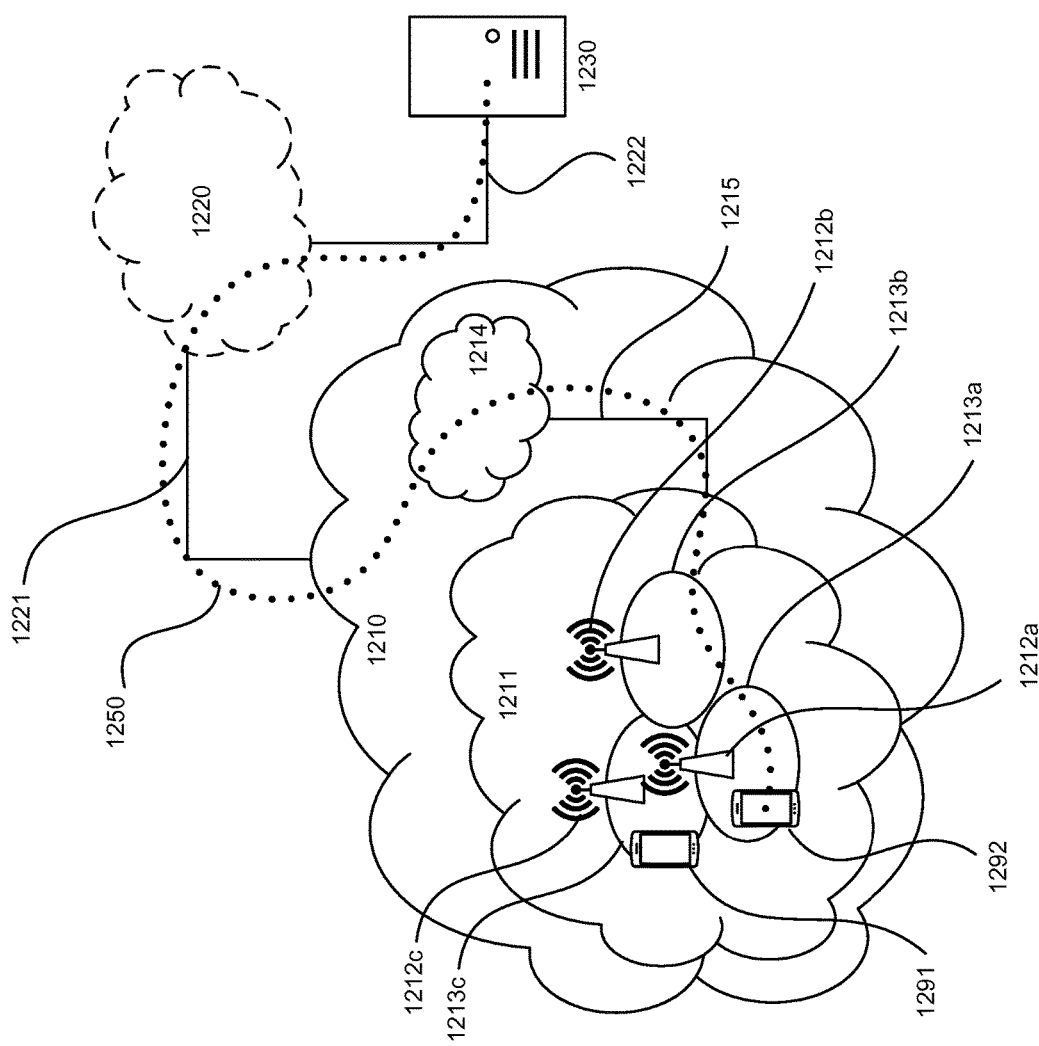
FIG. 12 is a block diagram of a communication network with a host computer according to some embodiments.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
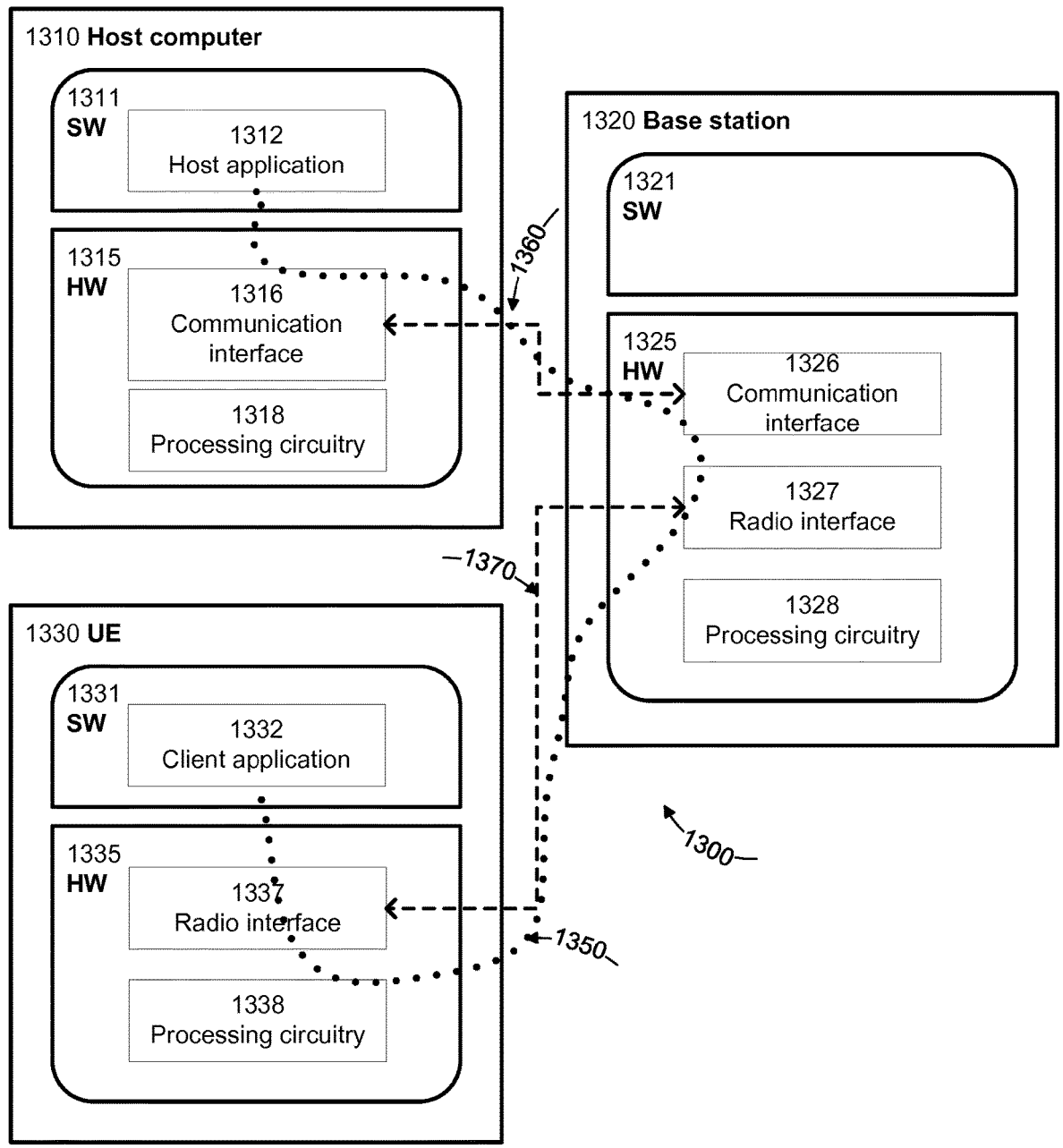
FIG. 13 is a block diagram of a host computer according to some embodiments.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may reduce false paging probability, reduce wireless device power consumption, and reduce wireless device processing load and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
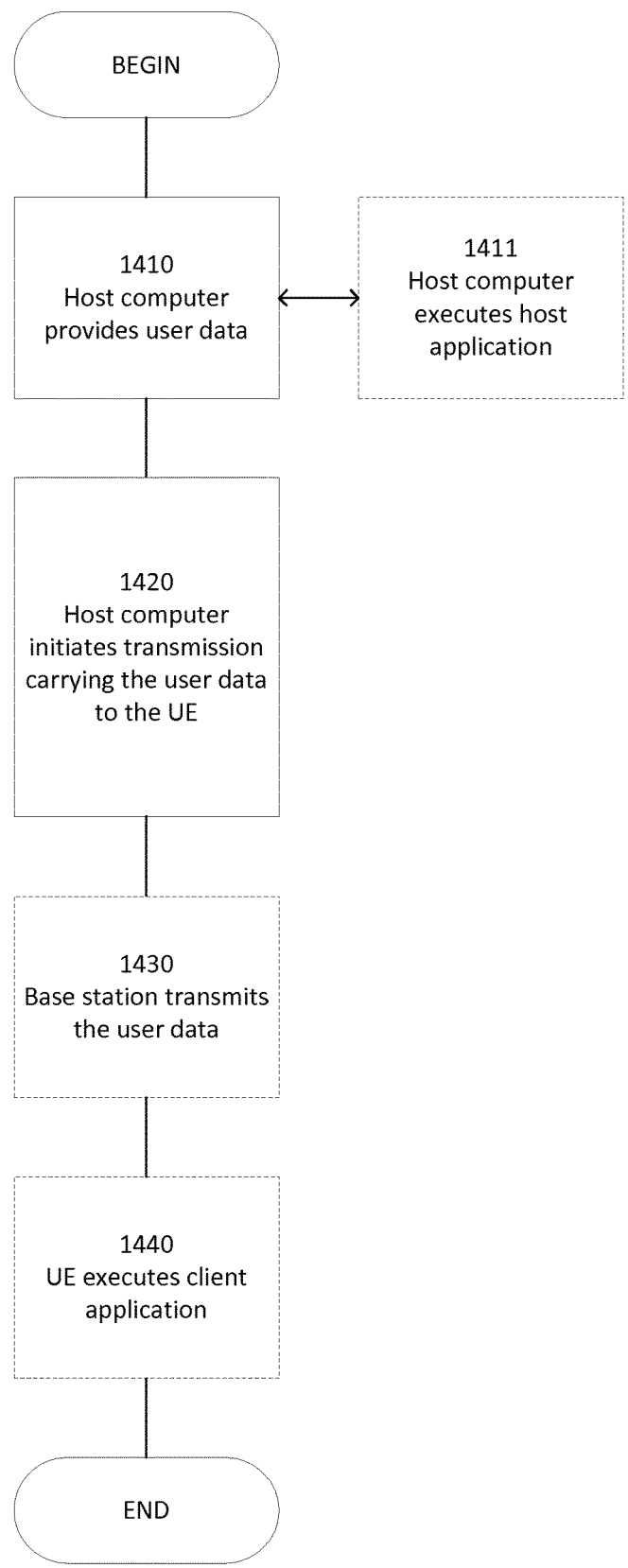
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
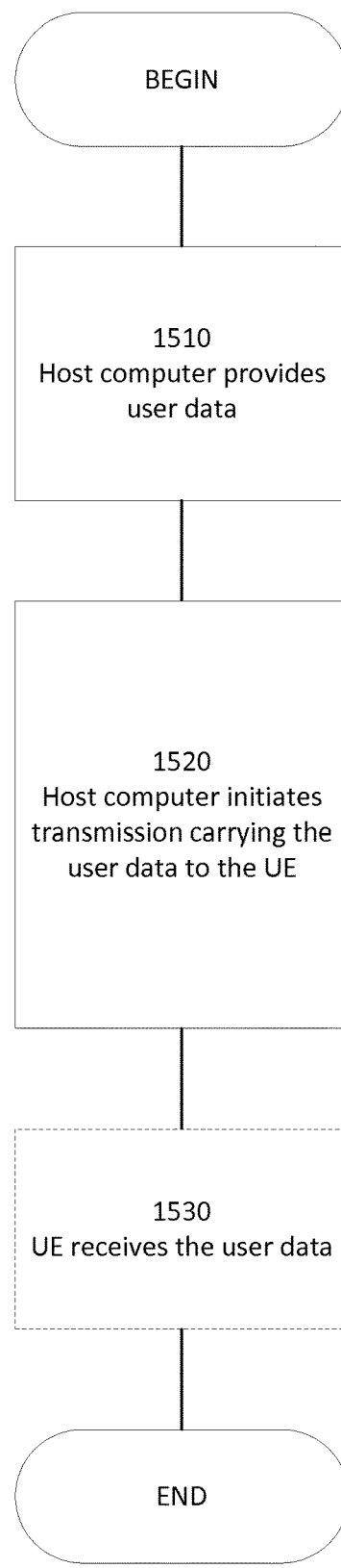
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
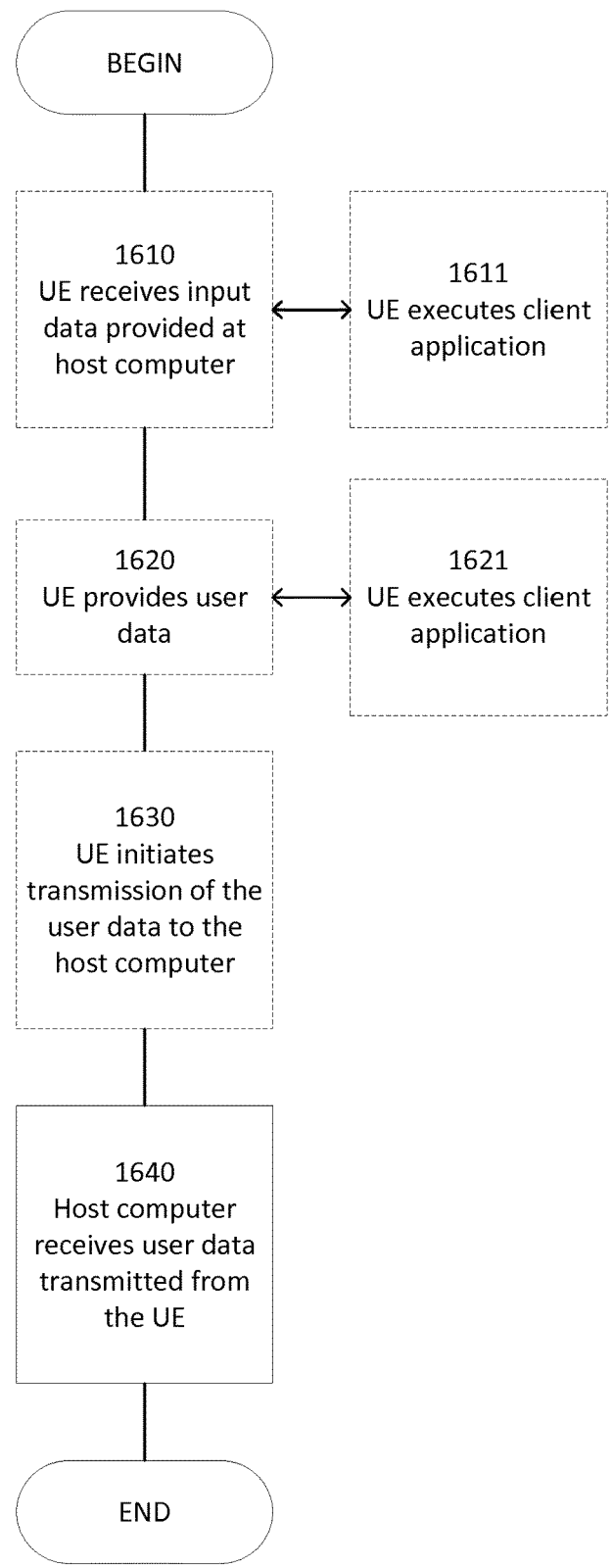
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
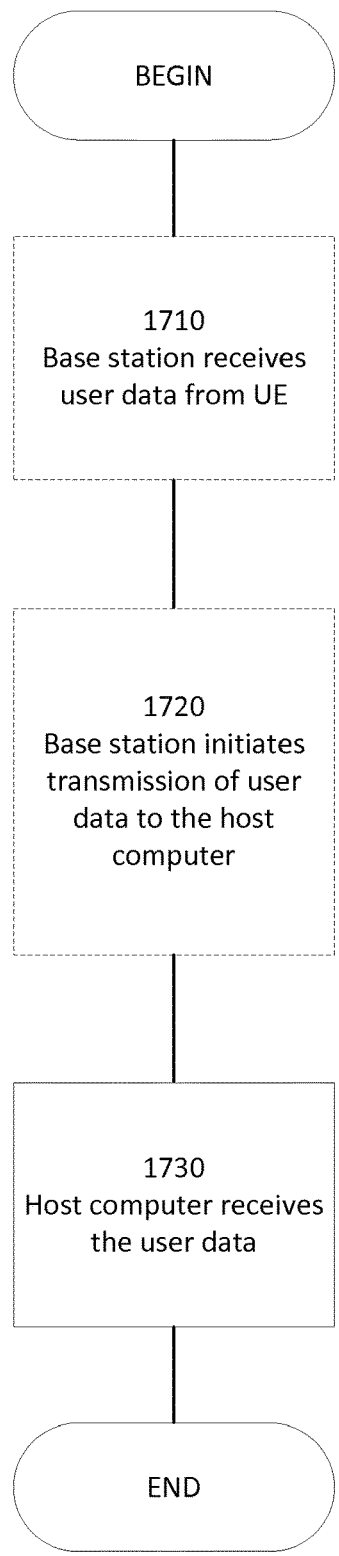
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a wireless device configured for use in a wireless communication system, the method comprising:
   determining a wake-up signal (WUS) group to which the wireless device belongs, based on a function of:
      a device identifier for the wireless device;
      a number of paging frames per paging cycle;
      a number of paging occasions per paging frame; and
      a number of paging narrowbands or paging carriers; and
   monitoring for a WUS that indicates wireless devices in the determined WUS group to which the wireless device belongs are to wake up;
   wherin the function is equal to floor(floor(UE_ID/) N*Ns))/Nn) mod Nw, where UE_ID is the device identifier, where N is the number of paging frames per paging cycle, where Ns is the number of paging occasions per paging frame, where Nn is a number of paging narrowbands or paging carriers, and where Nw is a number of WUS groups.

2. The method of claim 1, wherein the function is a third function, wherein:
   according to a first function, a paging frame of the wireless device depends on a first portion of bits of the device identifier;
   according to a second function, a paging narrowband or paging carrier of the wireless device depends on a second portion of bits of the device identifier; and
   according to the third function, the WUS group of the wireless device depends on a third portion of bits of the device identifier that is different than the first portion and/or that is different than the second portion.

3. The method of claim 2, wherein the third portion is independent, non-overlapping, and/or uncorrelated with the first portion and/or the second portion.

4. The method of claim 1, wherein the device identifier is an international mobile subscriber identifier, IMSI, for the wireless device, or is based on the IMSI.

5. The method of claim 1, wherein the function, based on which the WUS group to which the wireless device belongs is determined, is a third function, and wherein the method further comprises one or more of:
   determining a paging frame of the wireless device based on a first function of the device identifier; and
   determining a paging narrowband or carrier of the wireless device based on a second function of the device identifiers
wherein the third function is different than the first function and/or is different than the second function.

6. The method of claim 1, further comprising:
receiving the WUS based on said monitoring;
responsive to receiving the WUS, awakening the wireless device from a sleep state; and
after awakening, monitoring for a paging message during the paging frame and/or on a paging narrowband or paging carrier.

7. A method performed by a radio network node configured for use in a wireless communication system, the method comprising:
determining a wake-up signal (WUS) group to which a wireless device belongs, based on a function of:
a device identifier for the wireless device;
a number of paging frames per paging cycle;
a number of paging occasions per paging frame; and
a number of paging narrowbands or paging carriers; and
transmitting a WUS that indicates wireless devices in the determined WUS group to which the wireless device belongs are to wake up;
wherein the function is equal to floor(floor(UE_ID/(N*Ns))/Nn) mod Nw, where UE_ID is the device identifier, where N is the number of paging frames per paging cycle, where Ns is the number of paging occasions per paging frame, where Nn is a number of paging narrowbands or paging carriers, and where Nw is a number of WUS groups.

8. The method of claim 7, wherein the function is a third function, wherein:
according to a first function, the paging frame of the wireless device depends on a first portion of bits of the device identifier;
according to a second function, the paging narrowband or paging carrier of the wireless device depends on a second portion of bits of the device identifier; and
according to the third function, the WUS group of the wireless device depends on a third portion of bits of the device identifier that is different than the first portion and/or that is different than the second portion.

9. The method of claim 8, wherein the third portion is independent, non-overlapping, and/or uncorrelated with the first portion and/or the second portion.

10. The method of claim 7, wherein the device identifier is an IMSI for the wireless device, or is based on the IMSI.

11. The method of claim 7, wherein the function, based on which the WUS group to which the wireless device belongs is determined, is a third function, and wherein the method further comprises one or more of:
determining a paging frame of the wireless device based on a first function of the device identifier; and
determining a paging narrowband or carrier of the wireless device based on a second function of the device identifiers
wherein the third function is different than the first function and/or is different than the second function.

12. The method of claim 7, further comprising, after transmitting the WUS, transmitting a paging message to the wireless device during a paging frame and/or on a paging narrowband or paging carrier.

13. A wireless device configured for use in a wireless communication system, the wireless device comprising:
communication circuitry; and
processing circuitry configured to:
determine a wake-up signal (WUS) group to which the wireless device belongs, based on a function of:
a device identifier for the wireless device;
a number of paging frames per paging cycle;
a number of paging occasions per paging frame; and
a number of paging narrowbands or paging carriers; and
monitor for a WUS that indicates wireless devices in the determined WUS group to which the wireless device belongs are to wake up;
wherein the function is equal to floor(floor(UE_ID/(N*Ns))/Nn) mod Nw, where UE_ID is the device identifier, where N is the number of paging frames per paging cycle, where Ns is the number of paging occasions per paging frame, where Nn is a number of paging narrowbands or paging carriers, and where Nw is a number of WUS groups.

14. The wireless device of claim 13, wherein the processing circuitry is further configured to:
receive the WUS based on said monitoring;
responsive to receiving the WUS, awaken the wireless device from a sleep state; and
after awakening, monitor for a paging message during the paging frame and/or on a paging narrowband or paging carrier.

15. The wireless device of claim 13, wherein the function is a third function, wherein:
according to a first function, a paging frame of the wireless device depends on a first portion of bits of the device identifier;
according to a second function, a paging narrowband or paging carrier of the wireless device depends on a second portion of bits of the device identifier; and
according to the third function, the WUS group of the wireless device depends on a third portion of bits of the device identifier that is different than the first portion and/or that is different than the second portion.

16. The wireless device of claim 15, wherein the third portion is independent, non-overlapping, and/or uncorrelated with the first portion and/or the second portion.

17. The wireless device of claim 13, wherein the device identifier is an international mobile subscriber identifier, IMSI, for the wireless device, or is based on the IMSI.

18. The wireless device of claim 13, wherein the function, based on which the WUS group to which the wireless device belongs is determined, is a third function, and wherein the processing circuitry is further configured to:
determine a paging frame of the wireless device based on a first function of the device identifier; and/or
determine a paging narrowband or carrier of the wireless device based on a second function of the device identifier;
wherein the third function is different than the first function and/or is different than the second function.

19. A radio network node configured for use in a wireless communication system, the radio network node comprising:
communication circuitry; and
processing circuitry configured to:
determine a wake-up signal, WUS, group to which a wireless device belongs, based on a function of:
a device identifier for the wireless device;
a number of paging frames per paging cycle;
a number of paging occasions per paging frame; and
a number of paging narrowbands or paging carriers; and
transmit a WUS that indicates wireless devices in the determined WUS group to which the wireless device belongs are to wake up;
wherein the function is equal to floor(floor(UE_ID/(N*Ns))/Nn) mod Nw, where UE_ID is the device identifier, where N is the number of paging frames per paging cycle, where Ns is the number of paging occasions per paging frame, where Nn is a number of paging narrowbands or paging carriers, and where Nw is a number of WUS groups.

* * * * *

UNITED STATES PATENT AND TRADEMARK OFFICE
CERTIFICATE OF CORRECTION

PATENT NO. : 11,924,763 B2  
APPLICATION NO. : 17/290597  
DATED : March 5, 2024  
INVENTOR(S) : Höglund et al.

Page 1 of 1

It is certified that error appears in the above-identified patent and that said Letters Patent is hereby corrected as shown below:

In the Specification

In Column 11, Line 7, delete "UEID" and insert -- UE_ID --, therefor.

Figure 6:
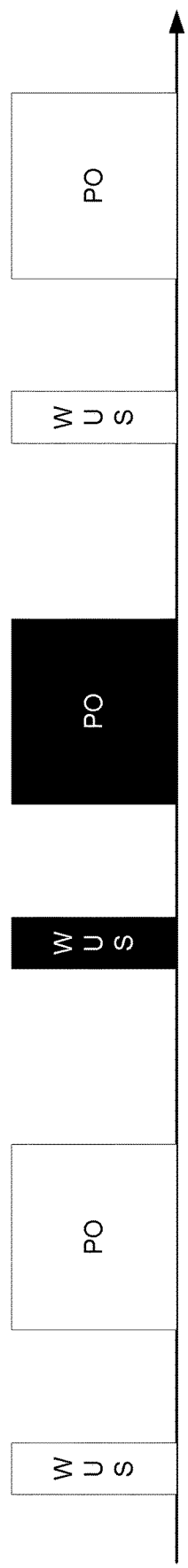
FIG. 6 is a block diagram of wake-up signaling according to some embodiments.

In Column 14, Lines 59-60, delete "FIG. 6Error! Reference source not found.," and insert -- FIG. 6, --, therefor.

In Column 30, Line 35, delete "(SIM/RUIM) module," and insert -- module (SIM/RUIM), --, therefor.

In the Claims

In Column 40, Line 32, in Claim 1, delete "wherin the function is equal to floor(floor(UE_ID/)" and insert -- wherein the function is equal to floor(floor(UE_ID/( --, therefor.

In Column 40, Line 65, in Claim 5, delete "identifiers" and insert -- identifier; --, therefor.

In Column 41, Line 53, in Claim 11, delete "identifiers" and insert -- identifier; --, therefor.

Signed and Sealed this  
Eleventh Day of February, 2025

Coke Morgan Stewart  
*Acting Director of the United States Patent and Trademark Office*